US008180902B1

(12) United States Patent
Day et al.

(10) Patent No.: US 8,180,902 B1
(45) Date of Patent: May 15, 2012

(54) ESTABLISHING NETWORK CONNECTIONS BETWEEN TRANSPARENT NETWORK DEVICES

(75) Inventors: Mark Stuart Day, Milton, MA (US); Brian Miller, San Francisco, CA (US); Nitin Gupta, Fremont, CA (US); Alfred Landrum, San Francisco, CA (US); Blanco Zee Leung Lam, Singapore (SG)

(73) Assignee: Riverbed Technology, Inc., San Francisco, CA (US)

( * ) Notice: Subject to any disclaimer, the term of this patent is extended or adjusted under 35 U.S.C. 154(b) by 318 days.

(21) Appl. No.: 12/571,430

(22) Filed: Sep. 30, 2009

Related U.S. Application Data

(63) Continuation-in-part of application No. 12/398,898, filed on Mar. 5, 2009, now Pat. No. 7,984,160.

(51) Int. Cl.
*G06F 15/16* (2006.01)
*G06F 12/00* (2006.01)

(52) U.S. Cl. ........................................ 709/227; 709/228

(58) Field of Classification Search .................. 709/203, 709/225–229, 231, 238, 250
See application file for complete search history.

(56) References Cited

U.S. PATENT DOCUMENTS

| | | | |
|---|---|---|---|
| 5,371,852 A | 12/1994 | Attanasio et al. | |
| 6,104,717 A | 8/2000 | Coile et al. | |
| 6,415,329 B1 | 7/2002 | Gelman et al. | |
| 6,449,658 B1 | 9/2002 | Lafe et al. | |
| 6,507,564 B1 | 1/2003 | Merchant | |
| 6,510,469 B1 | 1/2003 | Starnes et al. | |
| 6,542,964 B1 | 4/2003 | Scharber | |
| 6,751,677 B1 * | 6/2004 | Ilnicki et al. ................... 719/316 |
| 7,363,363 B2 | 4/2008 | Dal Canto et al. | |
| 7,641,562 B2 * | 1/2010 | Nakamura ..................... 464/175 |
| 7,701,956 B2 | 4/2010 | Howe | |
| 7,769,858 B2 | 8/2010 | Corl, Jr. et al. | |
| 7,948,921 B1 | 5/2011 | Hughes et al. | |
| 7,984,160 B2 | 7/2011 | Lam | |
| 2005/0107102 A1 | 5/2005 | Yoon et al. | |
| 2005/0165885 A1 | 7/2005 | Wong | |
| 2006/0023721 A1 | 2/2006 | Miyake et al. | |
| 2006/0123477 A1 * | 6/2006 | Raghavan et al. ............. 726/22 |
| 2007/0038853 A1 | 2/2007 | Day et al. | |
| 2007/0233857 A1 * | 10/2007 | Cheng et al. .................. 709/224 |
| 2008/0205315 A1 | 8/2008 | Park et al. | |

(Continued)

OTHER PUBLICATIONS

Knutsson, Bjorn et al., "Transparent Proxy Signalling", pp. 1-11, 1229-2370/99, KICS.

(Continued)

*Primary Examiner* — Zarni Maung
(74) *Attorney, Agent, or Firm* — Park, Vaughan, Fleming & Dowler LLP

(57) ABSTRACT

Transparent network devices intercept messages from non-transparent network devices that establish a connection. Transparent network devices modify these messages to establish an inner connection with each other. The transparent network devices mimic at least some of the outer connection messages to establish their inner connection. The mimicked messages and any optional reset messages are intercepted by the transparent network devices to prevent them from reaching the outer connections. Transparent network devices modify network traffic, using error detection data, fragmentation data, or timestamps, so that inner connection network traffic inadvertently received by outer connection devices is rejected or ignored by the outer connection network devices. Transparent network devices may use different sequence windows for inner and outer connection network traffic. To prevent overlapping sequence windows, transparent network devices monitor the locations of the inner and outer connection sequence windows and may rapidly advance the inner connection sequence window as needed.

28 Claims, 12 Drawing Sheets

U.S. PATENT DOCUMENTS

2008/0320151 A1 12/2008 McCanne et al.
2008/0320154 A1* 12/2008 Demmer et al. .............. 709/229
2009/0157866 A1* 6/2009 Sridharan et al. ............ 709/224
2009/0157888 A1 6/2009 Demmer et al.
2010/0228867 A1 9/2010 Lam
2010/0318665 A1 12/2010 Demmer et al.

OTHER PUBLICATIONS

Rodriguez, Pablo et al., "TPOT: Translucent Proxying of TCP", Computer Communications, V. 24, No. 2, Feb. 2001.

* cited by examiner

ESTABLISHING NETWORK CONNECTIONS BETWEEN TRANSPARENT NETWORK DEVICES

BACKGROUND

The present invention relates to the field of network devices in general and in particular to establishing and maintaining communications between network devices in a transparent manner.

Data communications networks, such as local area networks (LANs) and wide area networks (WANs) often include a variety of network devices for sending, receiving, directing, and optimizing network data traffic. Examples of common network devices include routers, switches, storage-area network front-ends and interfaces, network-address translation (NAT) and firewall devices, and wireless network devices such as access points, bridges, and repeaters. More specialized network devices include standalone print-servers, streaming video and music servers, logging and network management devices, and network monitoring and traffic inspection devices.

WAN accelerators are another example of a network device. WAN accelerators optimize network traffic to improve network performance in reading and/or writing data over a network. WAN accelerators are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers. Additionally, techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. Herein, the term "WAN accelerator" is used to refer to such devices and "WAN acceleration" is used to refer to such techniques.

WAN accelerators communicate with each other to compress, prefetch, cache, and otherwise optimize network traffic over a WAN. Typically, one network device, referred to as a client, will initiate a connection with a second network device, referred to as a server. A first WAN accelerator will intercept this connection request and form an "inner channel" for communicating with a second WAN accelerator using a second, distinct socket pair. In one arrangement, the client's connection is terminated at the first WAN accelerator. The second WAN accelerator may also form a connection for communicating with the server, These connections between the client and the first WAN accelerator and between the server and the second WAN accelerator appear to the client and server as a single logical end-to-end connection and are referred to collectively as an "outer connection."

A WAN accelerator may intercept outer connection network traffic from a client or server; compress, prefetch, cache, and otherwise optimize this network traffic; and communicate this optimized network traffic to the other WAN accelerator via the inner channel. The other WAN accelerator receives the optimized network traffic via the inner channel; decompresses or otherwise converts the optimized network traffic back to its original form; and forwards the converted network traffic to the receiving client or server via the outer connection.

Often, it is desirable for network devices to operate transparently to other client and server computer systems and network devices. In general, a network device is considered transparent if any intervening network device, referred to as a middle device, cannot distinguish network traffic between transparent devices from any client-server network traffic associated with the same network connection. Transparent network devices may often be installed with little or no reconfiguration of the network. For example, transparent network devices do not require the reassignment of network addresses or ports for other computer systems or network devices or the reconfiguration of routing information. Additionally, transparent network devices may not interfere with network monitoring and security devices. An example of transparent network devices is described in U.S. patent application Ser. No. 10/640,405, filed Aug. 12, 2003, and entitled "Transparent client-server transaction accelerator."

One complication with transparent network devices occurs when two or more transparent network devices need to communicate with each other. When transparent network devices communicate with each other via an inner channel, the inner channel network traffic between these transparent devices generally has the same source and destination network addresses and ports as outer channel network traffic between other devices, such as client and server computer systems. For example, a first WAN accelerator operating transparently may intercept a connection request from a client to a server and send it on to its destination, forming an outer connection between the client and server using a first socket pair. The first transparent WAN accelerator will then form an inner channel for communicating with a second transparent WAN accelerator using the same socket pair.

This sharing of network addresses and ports makes the network devices and their traffic transparent. Other aspects of the network traffic, such as sequence numbers, window sizes, and/or TCP options or other packet attributes, are used to distinguish between inner channel network packets, which are addressed to a computer system or network device but intended for a transparent network device, and "outer channel" network packets, which are addressed to and intended to reach a computer system or network device. In one type of configuration, it is the responsibility of the transparent network devices to intercept inner channel network traffic before it reaches its destination addresses. In another type of configuration, another network device, such as a router or switch, may intercept network traffic and redirect some or all of it to a transparent network device, for example using mechanisms such as WCCP or PBR.

However, communications between transparent network devices is vulnerable to several problems. First, middle devices, such as firewalls, proxies, network address translation (NAT) devices, can mistakenly block or misdirect communications between transparent network devices, interfering with the establishment and operation of an inner channel between transparent network devices. Additionally, network packets addressed to a computer system or network device but intended for a transparent network device may be directed around the transparent network device. As a result, inner channel network packets may accidentally reach its addressed destination. If the receiving computer or network device accepts the inner channel network packet, it may misinterpret the data intended for the transparent network device as its own data, resulting in errors or data corruption. Furthermore, network traffic associated with an inner channel may be misinterpreted by network monitoring devices and applications as duplicate or redundant connections, invalid network traffic, or network errors such as retransmits and connection resets. This misinterpretation not only makes network monitoring inaccurate, but can hide actual network problems from network administrators.

BRIEF DESCRIPTION OF THE DRAWINGS

The invention will be described with reference to the drawings, in which.

SUMMARY

Figure 1A:
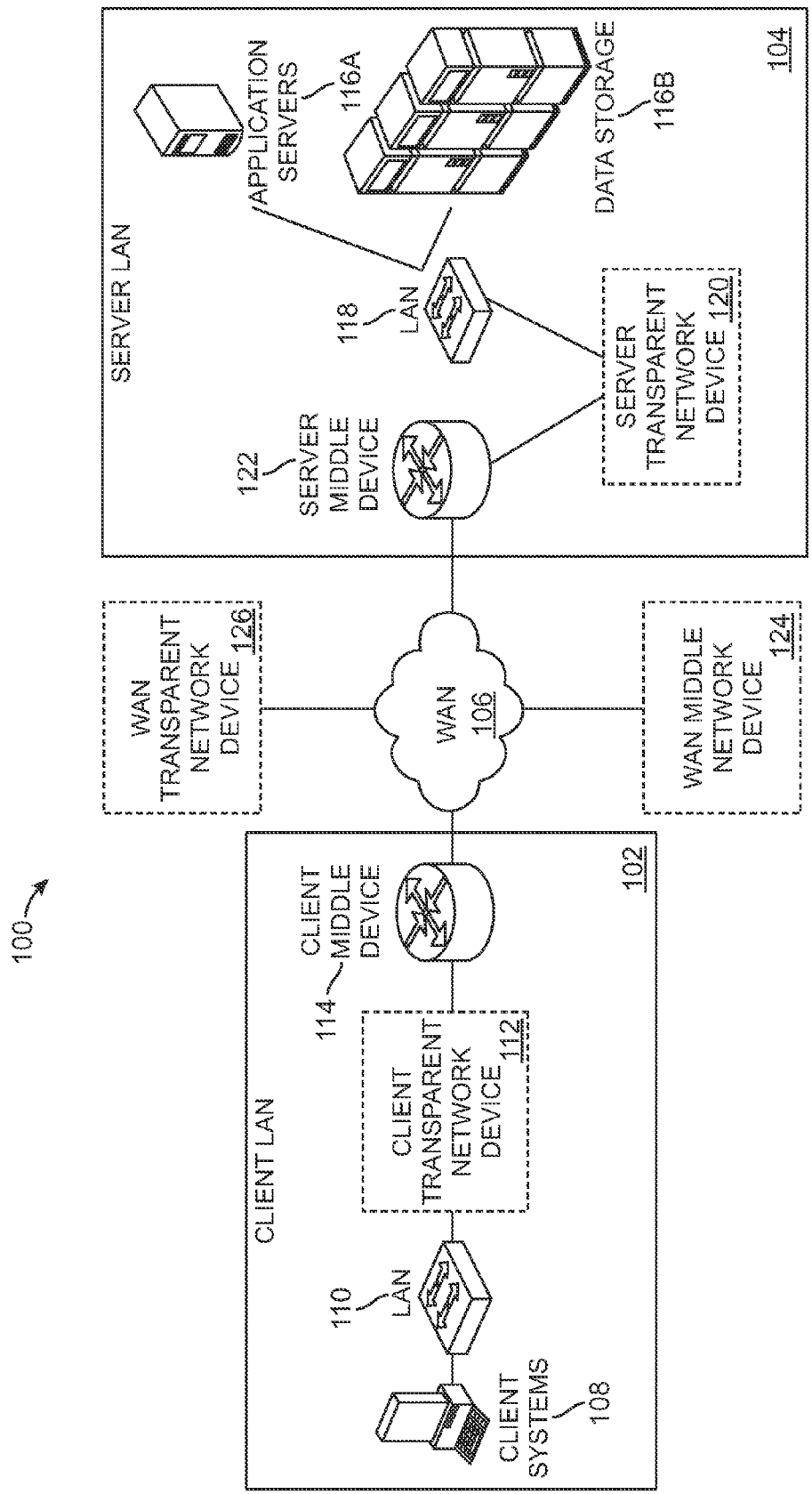
FIGS. 1A-1C illustrates a network including transparent network devices suitable for use with embodiments of the invention.

Embodiments of the invention establish inner connections between transparent network devices using the same network addresses associated with non-transparent network devices using outer connections. In an embodiment, a transparent network device intercepts messages from a non-transparent network device that are used to establish an outer connection with another non-transparent network device. The transparent network device modifies these messages to also establish an inner connection with another transparent network device. In an embodiment, transparent network devices encode inner connection-related information in portions of these messages that are unexamined by middle devices and/or unrelated to the establishment of the outer connection. Transparent network devices use this encoded information to establish an inner connection with each other.

Additionally, the transparent network devices establish an inner connection using interactions that appear to middle devices as establishing the outer connection. In one approach, the transparent network devices mimic the outer connection messages to establish their inner connection. The mimicked messages may appear to any middle devices, such as firewalls, NAT devices, or proxies devices, as retransmits of the messages used to establish the outer connection. In another approach, the transparent network devices send a reset message prior to mimicking these outer connection messages, so that the outer connection appears reset to middle devices. The mimicked messages and any reset messages are intercepted by the transparent network device and prevented from reaching the network devices associated with the outer connection. In yet another approach, the transparent network devices use the same messages to establish both the inner connection and the outer connection.

Embodiments of the invention may also modify inner connection and outer connection network traffic to prevent data corruption. Because the transparent network devices may use the same network addresses as other non-transparent network devices for inner connection network traffic, some inner connection network traffic may not be intercepted by the intended transparent network device and instead inadvertently reach its addressed destination. If inner connection network traffic is inadvertently received by an outer connection network device, data corruption may result. Embodiments of the transparent network devices modify inner connection and/or outer connection network traffic so that any inner connection network traffic inadvertently received by outer connection devices is rejected or ignored by the outer connection network devices.

In one approach, an embodiment of transparent network devices send inner connection network traffic using deliberately invalid error detection data. This causes outer connection network devices to reject inner connection network traffic as corrupt. However, embodiments of the transparent network devices may be adapted to ignore or compensate for the deliberately invalid error detection data, so that inner connection network traffic is not rejected by transparent network devices unless it is actually corrupt. In another approach, transparent network devices mark inner connection network traffic as fragmented, so that outer connection network devices will not process inner connection network traffic. In yet another approach, transparent network devices modify timestamp values of outer connection network traffic, so that outer connection network devices will discard inner connection network traffic as out of date.

Transparent network devices use the same network ports and optionally network addresses as their associated outer connections. To prevent data corruption due to misdirected inner connection network traffic, embodiments of the invention may use different sequence windows for inner and outer connection network traffic. However, if the amount of network traffic in the inner and outer network connections is different, the sequence windows of the inner and outer connections may eventually overlap. To prevent this, a further embodiment of the invention monitors the locations of the inner and outer connection sequence windows. If these sequence windows get close enough to potentially overlap, an embodiment of the invention rapidly advances the inner connection sequence window. This may be done by sending inner connection messages that skip large portions of the sequence numbers in the inner connection sequence window.

DETAILED DESCRIPTION OF ILLUSTRATIVE EMBODIMENTS

FIG. 1A illustrates a network 100 including transparent network devices suitable for use with embodiments of the invention. Network 100 includes a client local area network (LAN) 102 and a server LAN 104 connected via a wide-area network (WAN) 106, such as the Internet, an enterprise's internal WAN, or a service provider's fully controlled network. Client LAN 102 includes one or more client computer systems 108, which can include desktop computers, laptop computers, rack-mounted or blade computers, and mobile computing devices such as smartphones, tablet computers, and any other type of electronic device capable of communicating via an electronic communications network. Client computers 108 are connected via a LAN network 110, which can include wired network interfaces, such as Ethernet, and wireless network interfaces, such as any of the 802.11 family of wireless network interfaces. Network 100 and client LAN 102, server LAN 104, and WAN 106 can use a variety of communications protocols, including Media Access Control protocols, such as Ethernet, Internet layer protocols such as IP, transport layer protocols such as TCP and UDP, as well as standard or proprietary application layer protocols such as HTTP, POP and SMTP, and DNS.

LAN network 110 can also include other network devices, such as hubs, switches, routers and other network traffic directing devices; storage-area network front-ends and interfaces; proxies, network-address translation (NAT) and firewall devices; wireless network devices such as access points, bridges, and repeaters; print-servers, and other network service provider devices; one-way or two-way streaming video, audio, video-conferencing, VOIP, and music servers; network logging and network management devices; and network monitoring and traffic inspection devices.

Client LAN network 110 is connected with a client transparent network device 112. Client transparent network device 112 may be any type of network device that is operating or capable of operating in a transparent mode. While in a transparent mode, network traffic from client transparent network device 112 uses the same network address, such as an IP address, and optionally the same network port, as one or more of the client computer systems 108. In this manner, client transparent network device 112 is invisible to intervening middle devices such as firewalls, proxies, and/or NAT devices.

Server LAN 104 includes one or more server computer systems 116, which can include one or more application servers 116a and one or more data storage systems 116b, as well as optional desktop computers, laptop computers, server computers, and mobile computing devices such as smartphones, tablet computers, and any other type of electronic device capable of communicating via an electronic communications network. Server computers 116 are connected via a LAN network 118, which can include wired network interfaces, such as Ethernet, and wireless network interfaces, such as any of the 802.11 family of wireless network interfaces.

LAN network 118 can also include other network devices, such as hubs, switches, routers and other network traffic directing devices; storage-area network front-ends and interfaces; proxies, network-address translation (NAT) and firewall devices; wireless network devices such as access points, bridges, and repeaters; print-servers, and other network service provider devices; one-way or two-way streaming video, audio, video-conferencing, VOIP, and music servers; network logging and network management devices; and network monitoring and traffic inspection devices.

Server LAN network 118 is connected with a server transparent network device 120. Server transparent network device 120 may be any type of network device that is operating or capable of operating in a transparent mode. While in a transparent mode, network traffic from server transparent network device 120 uses the same network port and optionally the same network address, such as an IP address, as one or more of the server computer systems 116. In this manner, server transparent network device 120 is invisible to intervening middle devices such as firewalls, proxies, and/or NAT devices.

The client LAN network 110 may optionally include one or more middle devices 114, such as firewalls, proxies, and/or NAT devices, located between the client transparent network device 112 and the WAN 106. Similarly, the server LAN network 104 may optionally include one or more middle devices 122, such as firewalls, proxies, and/or NAT devices, located between the server transparent network device 120 and the WAN 106. In general, embodiments of the invention may be used in networks with at least one transparent network device, located either on the client LAN 102, server LAN 104, the WAN 106, or any other network between these networks 102, 104, and 106.

In an in-path network configuration, a transparent network device, such as the client transparent network device 112 or the server transparent network device 120 is adapted to intercept network traffic from network devices on its respective LAN, such as network traffic from client systems 108 or server computers 116. Additionally, the transparent network device is adapted to intercept inner channel network traffic from other transparent network devices on the WAN 106 or a different LAN before it reaches its destination address.

In an out-of-path network configuration, another network device, such as a router or switch, may intercept network traffic and redirect some or all of it to a transparent network device, for example using mechanisms such as WCCP or PBR. The intercepted network traffic may be outer connection network traffic from client or server computers or inner channel network traffic from other transparent network devices.

Furthermore, the WAN 106 may optionally include one or more middle devices 124, such as firewalls, proxies, and/or NAT devices. Additionally, the WAN 106 may optionally include one or more of additional transparent network devices 126 adapted to communicate with client transparent network device 112 and/or server transparent network device 120.

It should be noted that client computers 108 and other network devices in client LAN 102 may take on the roles of both clients or servers in network communications. Thus, client computers 108 and other network devices in client LAN 102 may initiate network communications (acting as clients) and/or receive network communications initiated by other network devices (acting as servers). Similarly, server computers 116 and other network devices in server LAN 104 may take on the roles of both clients or servers in network communications, initiating network communications (acting as clients) and/or receiving network communications initiated by other network devices (acting as servers).

Figure 1B:
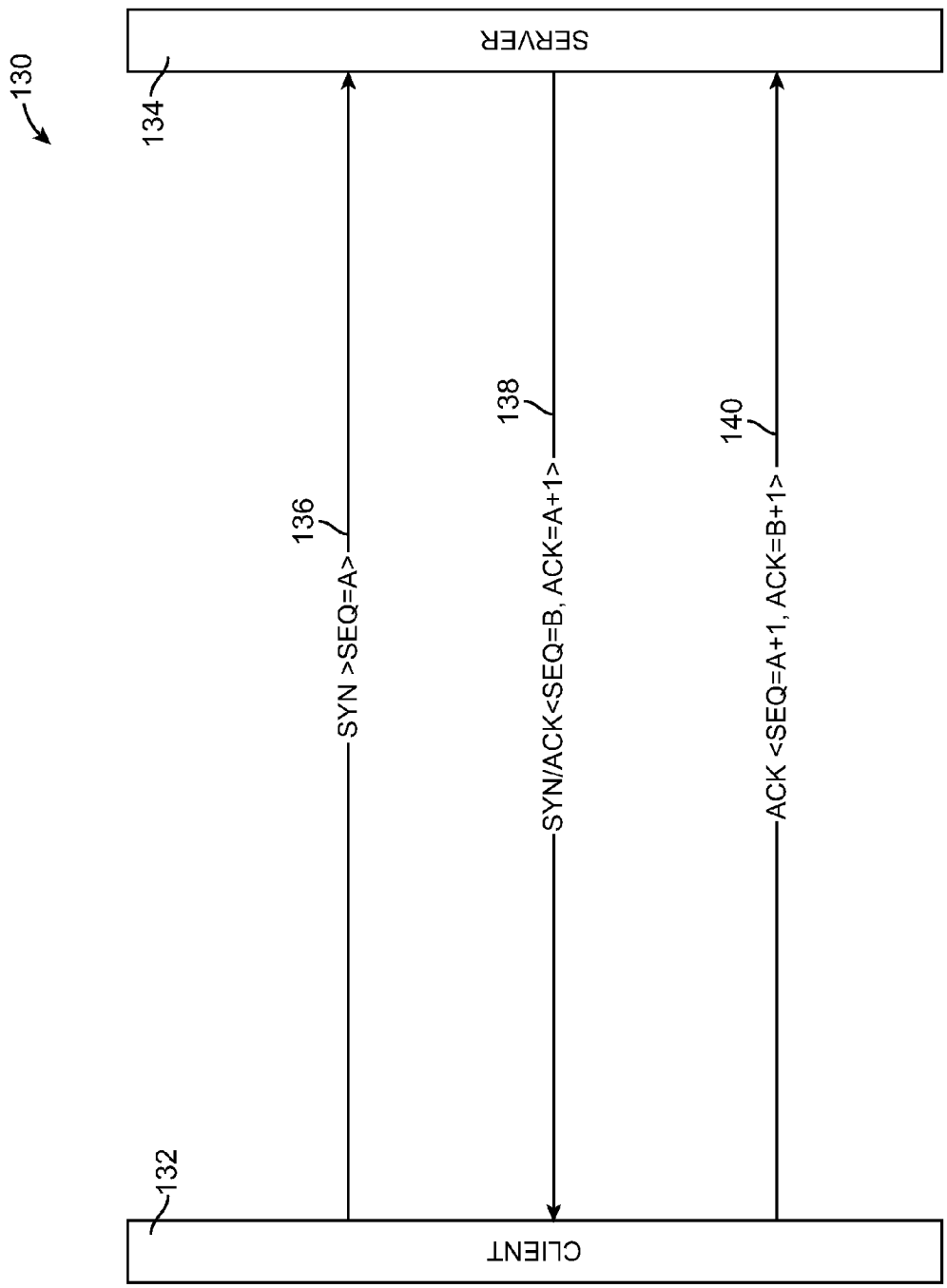

FIG. 1B illustrates an example 1300 of establishing a network connection between a client and a server using the TCP/IP protocol. TCP/IP uses a three-way handshake technique that is also employed by other standard and proprietary communication protocols. A client 132 initiates a connection with a server by sending a first message 136, referred to as a SYN message, addressed to a server 134. The SYN message 136 includes a sequence parameter "SEQ" set to a first value "A," which may be chosen randomly.

Upon receiving the SYN message 136, the server 134 sends a reply message 138, referred to as a SYN/ACK message, addressed to a client 132. The SYN/ACK message 138 includes its own sequence parameter SEQ set to a second value "B," which also may be chosen randomly. Additionally, the SYN/ACK message 138 includes an acknowledgement parameter set to a value of A+1, which is one more than the sequence value of the SYN message 136.

Upon receiving the SYN/ACK message 138, client 132 sends an acknowledgement message 140, referred to as an ACK message, addressed to the server. The ACK message 140 includes a sequence parameter set to the acknowledgement value received in message 138, which is A+1 in this example 130, The ACK message 140 also includes its own acknowledgement parameter set to a value of B+1, which is one more than the sequence value of the SYN/ACK message 138.

Upon the receipt of message 140 by server 134, the network connection between the client 132 and the server 134 is considered established.

Figure 1C:
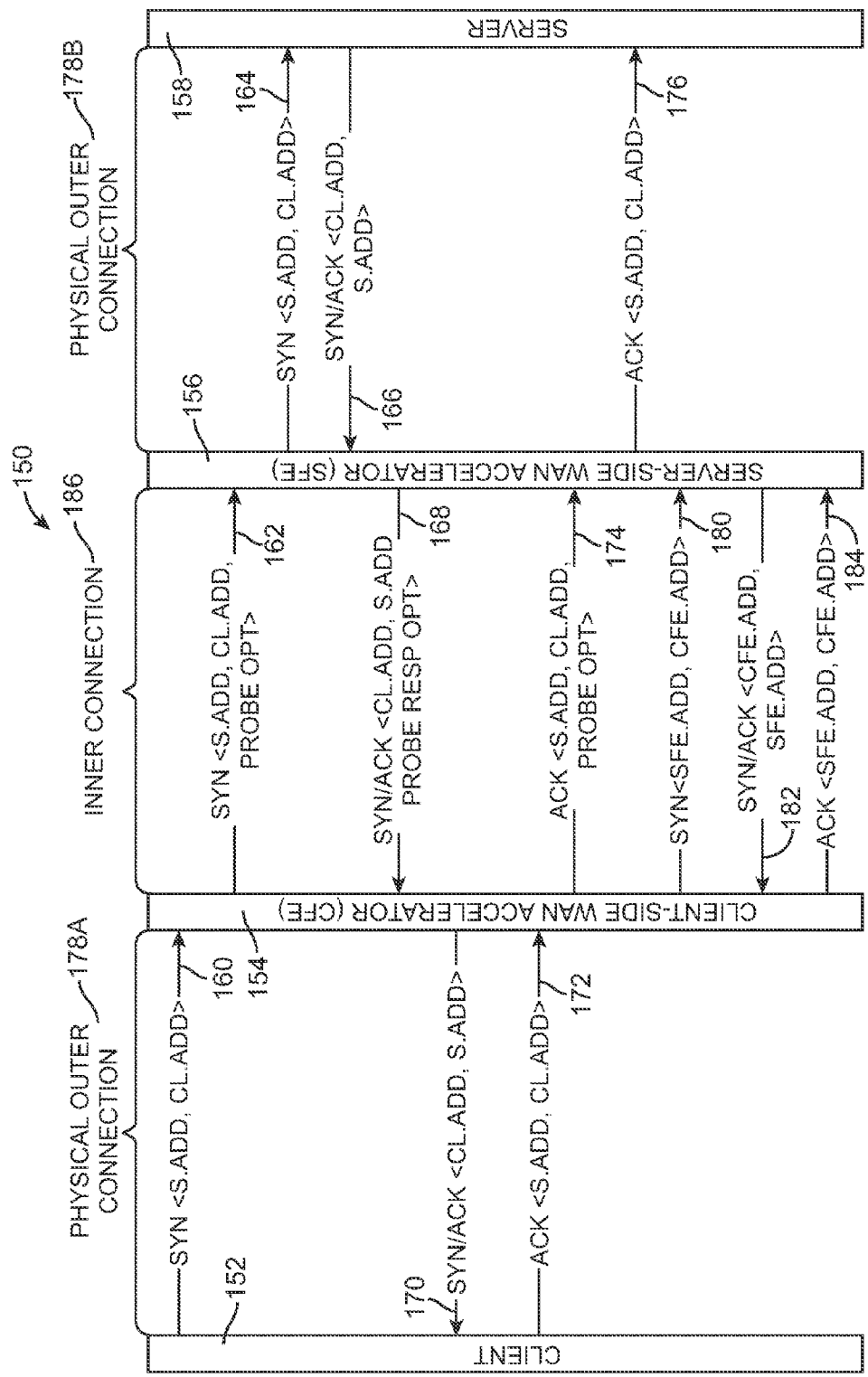

FIG. 1C illustrates an example 150 of establishing a network connection between a client and a server and a network connection between two non-transparent network devices. In example 150, a client 152 attempts to initiates a connection with a server 158 using TCP/IP or a similar protocol by sending a first SYN message 160. SYN message 160 has a source address of the client 152 ("CL. ADD") and a destination address of the server 158 ("S.ADD").

A client-side WAN accelerator (CFE) 154 intercepts message 160 and sends out a corresponding SYN message 162. SYN message 162 is similar to SYN message 160, except that it includes an indicator, referred to as a probe option, to indicate the presence of CFE 154 to any other intercepting WAN accelerators. This probe option indicator is included in a portion of the message 162 that may be ignored by the server 158 or other network devices.

Modified SYN message 162 is intercepted by a server-side WAN accelerator (SFE) 156. The SFE 156 detects the presence of the CFE 154 through the inclusion of the probe option in SYN message 162. In response to SYN message 162, the SFE 156 sends a modified SYN message 164 similar to SYN message 160, including a source address of the client 152 and a destination address of the server 158.

Upon receiving SYN message 164, server 158 sends a SYN/ACK message 166 as if it were establishing a normal network connection using the TCP/IP protocol. SYN/ACK message 166 includes a source address of the server 158 and a destination address of the client 152.

Like the SYN messages 160 and 160, SYN/ACK message 166 is intercepted by the SFE 156. SFE then sends a modified SYN/ACK message 168 addressed to the client 152, including a probe response option indicator to indicate the presence of the SFE 156 to the CFE 154. This probe response option indicator is included in a portion of the message 168 that may be ignored by the client 152 or other network devices.

SYN/ACK message 168 is intercepted by the CFE 154. CFE 154 detects the presence of the SFE 156 through the inclusion of the probe response option indicator in message 168. In response to the SYN/ACK message 168, CFE 154 sends a SYN/ACK message 170 similar to SYN/ACK message 166, including a source address of the server 158 and a destination address of the client 152.

SYN/ACK message 170 is received by the client 152 and interpreted by the client 152 as if this message 170 was sent directly from the server 158, without being intercepted by the SFE 158 or CFE 156. In response to SYN/ACK message 170, client 152 sends an ACK message 172. ACK message 172 has a source address of the client 152 and a destination address of the server 158.

The CFE 154 intercepts message 172 and sends out a corresponding ACK message 174. ACK message 174 is similar to ACK message 172, except that it includes an indicator, referred to as a probe option, to indicate the presence of CFE 154 to the SFE 156. Modified ACK message 174 is intercepted by the SFE 156.

Upon intercepting ACK message 174, the SFE 156 detects the presence of the CFE 154 through the inclusion of the probe option in ACK message 174. After receiving ACK message 174, the SFE 156 sends an ACK message 176 similar to ACK message 172, including a source address of the client 152 and a destination address of the server 158. The server 158 receives ACK message 174 and interprets it as if it were sent directly by the client 152. At this point, a logical network connection has been established between the client 152 and the server 158. This logical network connection is referred to as an outer connection.

In the example 150, the outer connection is comprised of two physical outer connections, 178a and 178b. Physical outer connection 178a originates with client 152 and is terminated at CFE 154. However, the client 152 believes that this physical outer connection 178a terminates at server 158. Similarly, physical outer connection 178b originates with SFE 156 and is terminated at server 158. However, the server 158 believes that this physical outer connection 178b originates at client 152.

Following the receipt of the ACK message 172, the CFE 154 and SFE 156 establish a separate network connection, referred to as an inner connection, for communicating with each other independently of the any communications between the client 152 and the server 158.

In other implementations, the outer connection is comprised of a single end-to-end physical connection between the client 152 and the server 158. The CFE 154 and SFE 156 use tunneling to encapsulate the outer connection within the inner connection between the CFE 154 and the SFE 156. In a further implementation, the CFE 154 and SFE 156 may encapsulate multiple outer connections between one or more pairs of clients and servers within a single inner connection.

In general, both the inner connection and outer connection may each be comprised of one or more physical network connections. As described above, a first portion of the outer connection may include a physical connection between a client and a client transparent network device and a second portion of the outer connection may include a physical connection between a server and a server transparent network device. Similarly, a first portion of an inner connection may include a physical connection between a client transparent network device and a middle transparent network device and a second portion of the inner connection may include a physical connection between a middle transparent network device and a server transparent network device.

In one implementation, the CFE 154 sends a SYN message 180 including a source address of the CFE ("CFE ADD") 154 and a destination address of the SFE ("SFE ADD") 156. Upon receiving the SYN message 180, the SFE 156 responds with a SYN/ACK message 182, also including the network address of the CFE 154 and SFE 156 as the destination and source addresses, respectively. Upon receiving the SYN/ACK message 182, the CFE 154 responds with an ACK message 184. Like SYN message 180, ACK message 184 also includes the network address of the CFE 154 and SFE 156 as the source and destination addresses, respectively.

At this point, a separate network connection between the CFE 154 and SFE 156 has been established. This network connection is referred to as an inner connection 186. The CFE 154 and SFE 156 use the inner connection 186 to communicate with each other, independently of any communications between the client 152 and server 154. Inner connection 186 is associated with the network addresses of the CFE 154 and SFE 156, which are different than those of the client 152 and server 158.

The logical outer connection allows the client 152 and server 158 to communicate with each other. Outer connection network traffic between the client 152 and server 158 is carried by the inner connection 180, in its original or an optimized form, between the CFE 154 and SFE 156.

In general, network devices communicate using messages, such as packets. A typical message includes a message header portion and a message data portion. The message data portion includes the data to be communicated between network devices. The message header portion includes information used by network devices to direct the message to at least one destination network device and optionally to enable the receiving network device to reply to the message. Examples of information included in message headers include source and destination network addresses; source and destination network ports; error detection and/or correction information, such as hashes or checksums; and flow control information, such as sequence numbers.

Middle devices examine some portions of the message header to process network traffic and to perform their intended functions. The examined portion of the message header includes connection-related information and connection-unrelated information. The connection-related information is used by middle devices to identify a specific traffic flow or connection associated with a message.

For network devices to establish transparent inner connections in presence of middle devices, middle devices should not be able to distinguish inner connection messages from outer connection messages associated with the same connection.

In the example 150 of FIG. 1C, the inner connection is associated with different network addresses and/or network ports than those associated with the logical outer connection between the client 152 and the server 158. As a result, any middle devices between the WAN accelerators 154 and 156 will be able to distinguish inner connection network traffic from outer connection network traffic at least due to the difference in network addresses and/or network ports. Thus, the WAN accelerators 154 and 156 are not considered transparent. As a result, WAN accelerator devices 154 and 156 may be difficult to integrate with the security and reporting infrastructure associated with the client-side and server-side LAN as well as the WAN.

Embodiments of the invention may use any technique known in the art to detect transparent network devices for the purpose of establishing an inner connection, including those described in U.S. Pat. No. 7,318,100, entitled "Cooperative proxy auto-discovery and connection interception," and U.S. patent application Ser. No. 11/755,692, filed May 30, 2007, entitled "Selecting proxies from among autodiscovered proxies," both of which are incorporated by reference herein.

FIGS. 2-5 illustrate examples of establishing inner connections between transparent network devices according to embodiments of the invention. To achieve this, embodiments of the invention establish inner connections between transparent network devices using messages with identical connection-related information in their message headers as that in an associated outer connection. Embodiments of the invention encode inner connection related information within portions of the message header that are not examined by middle devices and/or within the connection-unrelated information in any examined portion of the message header. The portions of a message that are unexamined by middle devices and/or that are examined but unrelated to the connection are referred to as collectively as the transparency-unrelated portions of the message.

Transparency-unrelated portions of messages include any header field of the message except for the source address and port and the destination address and port. Examples of transparency-unrelated portions of a message include an optional extension field, such as the TCP options field of TCP/IP messages; sequence numbers; acknowledgement numbers; data offsets; reserved fields; control bits; window sizes; checksums; and urgent pointers. In some implementations, only a portion of the source address and port or destination address and port needs to be preserved to ensure transparency. For example, only a single source or destination port or address may need to be preserved in its original form to ensure transparency in some implementations.

Embodiments of the invention may also encode inner connection information in message bodies, instead of message headers. In this embodiment, a portion of the message body, such as the beginning or the end of the payload, could be used for encoding inner connection information. Provided the encoded inner connection information is distinctive, transparent network devices can detect and use the inner connection information to establish a transparent inner connection. By encoding inner connection information in the message body, transparent network devices avoid changing header fields of messages.

Additionally, embodiments of the invention may use interactions or sequences of message to establish a transparent inner connection that appear to middle devices as ordinary client-server network traffic. In the examples of FIGS. 2-5, the network addresses and port numbers used by the example messages may be identical, and thus are omitted for clarity.

Figure 2:
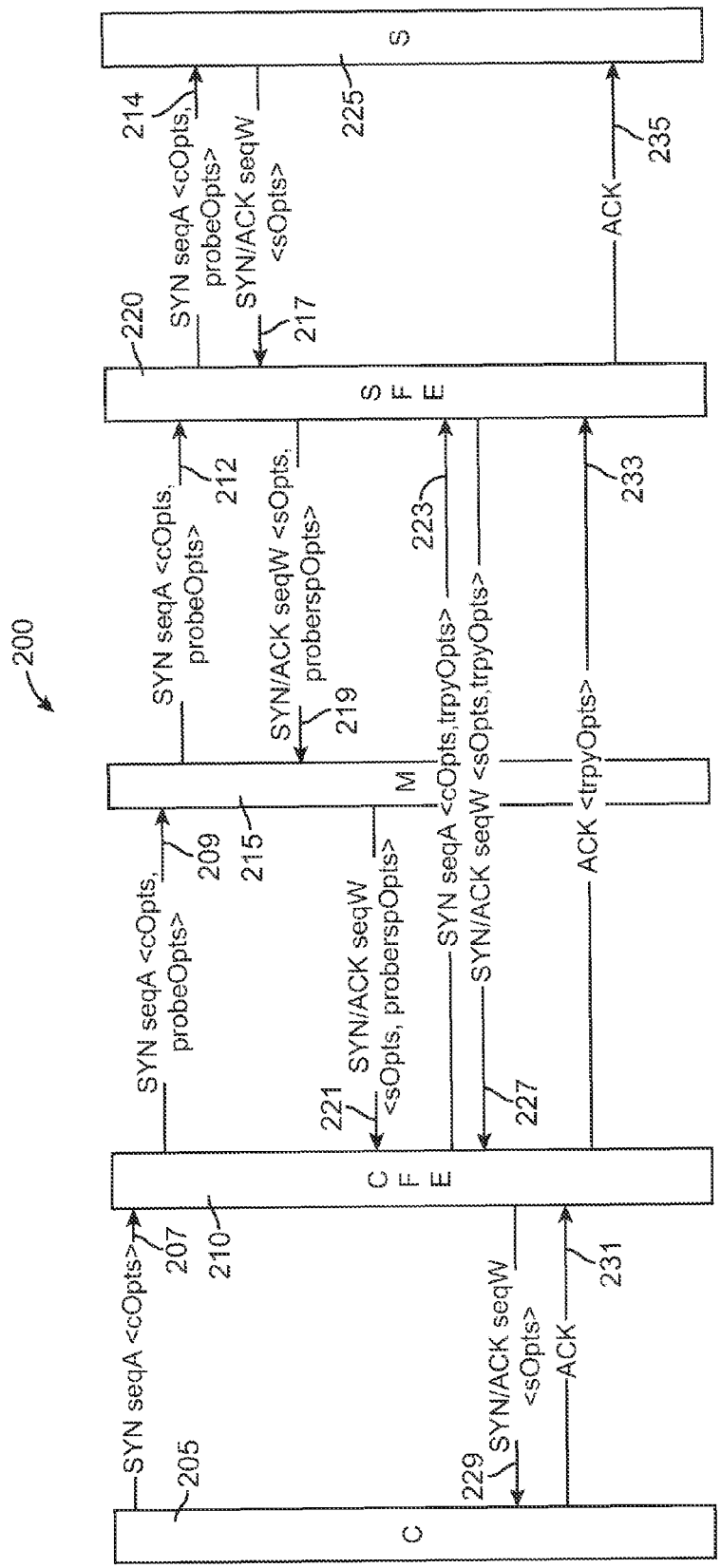
FIG. 2 illustrates a first method of establishing an inner connection between transparent network devices through one or more middle devices according to an embodiment of the invention.

FIG. 2 illustrates an example 200 of a first method of establishing an inner connection between transparent network devices through one or more middle devices according to an embodiment of the invention. Example 200 includes a client 205, such as one of the client systems 120 discussed above, a server 225, such as one of the server systems 145, a client transparent network device 210, a server transparent network device 220, and an optional middle transparent network device 215. One or more middle devices may be located anywhere between the client transparent network device 210 and the server transparent network device 220, including on a client LAN, server LAN, WAN, or other intervening LAN or WAN network.

Example 200 mimics the network traffic between the client and a server used to establish an outer connection to establish an inner connection between transparent network devices. Although example 200 uses the TCP/IP protocol, other embodiments of the invention may use other network protocols.

Example 200 begins with a client 205 sending a SYN message 207 addressed to a server 225. Message 207 is adapted to initiate a connection between the client 205 and the server 225, referred to as an outer connection. Message 207 includes any optional parameters, labeled cOpts in example 200, specified by the client 205. These optional parameters may be included in the TCP options of message 207. Message 207 is intercepted by the client transparent network device 210, which in response sends a similar SYN message 209 addressed to the server 225. SYN message 209 may also include the network address of the client 205 as its source address, so that message 209 appears to originate with client 205 rather than client transparent network device 210. Additionally, SYN message 209 includes TCP options including the cOpts specified by the client 205 as well as additional parameters specified by the client transparent network device 210, which are labeled probeOpts in example 200.

SYN message 209 may be intercepted by middle transparent network device 215, if it is present, which in turn re-emits this message unchanged in the form of SYN message 212. An embodiment of the middle transparent network device 215 may retransmit message 209 in the form of message 212 using stateless retransmission. In another embodiment, the middle transparent network device 215 may maintain state information from the interception and retransmission of messages 209 and 212.

SYN message 209 or 212 is intercepted by the server transparent network device 220. The server transparent network device 220 sends the received SYN message to server 225 in the form of SYN message 214, which may be unchanged from message 212 or may optionally omit the probeOpts included in message 212.

Server 225 treats the received message 214 like a normal connection request from a client and responds accordingly, for example, by sending SYN/ACK message 217 addressed to the client 205. SYN/ACK message 217 may include TCP options including any optional server parameters, labeled as sOpts in example 200. Upon receiving the SYN/ACK message 217 from the server 225, the server transparent network device 220 knows that is the last transparent network device between the client 205 and the server 225 and therefore needs to establish a connection with client transparent network device 210, referred to as an inner connection.

SYN/ACK message 217 is intercepted by server transparent network device 220. In response to message 217, server transparent network device 220 sends a similar SYN/ACK message 219 addressed to the client 205. However, SYN/ACK message 219 includes TCP options including additional server transparent network device parameters, labeled proberspOpts in example 200, that are provided by the server transparent network device 220.

SYN/ACK message 219 may be intercepted by middle transparent network device 215, if it is present, which in turn re-emits this message unchanged in the form of SYN/ACK message 221. If the middle transparent network device uses stateful retransmission, then SYN/ACK message 219 may modify or discard the associated state maintained by the middle transparent network device 215.

Client transparent network device 210 intercepts either message 219 or 221. Due to the presence of the proberspOpts included by the server transparent network device 220 in this SYN/ACK message, the client transparent network device 210 knows of the existence of the server transparent network device 220 adapted to intercept network traffic between client 205 and server 225. As a result, client transparent network device 210 can initiate the establishment of the inner connection between client transparent network device 210 and server transparent network device 220. Had the client transparent network device 210 intercepted a SYN/ACK message without the proberspOpts, client transparent network device 210 would assume that server transparent network device 220 did not exist or was not functioning, and thus, there would be no need to create an inner connection. The client transparent network device 220 would pass the intercepted SYN/ACK message on to the client 205 and allow it to establish a normal connection with the server 225.

The use of proberspOpts to detect a server transparent network device is one example of a technique for detecting transparent network devices. Embodiments of the invention may use any technique known in the art to detect transparent network devices for the purpose of establishing an inner connection, including those described above with reference to FIG. 1C.

In an embodiment, the client transparent network device 210 initiates the inner connection by sending a SYN message 223. To ensure that this SYN message 223 is not blocked by any middle devices, SYN message 223 is identical in many respects to the SYN message 207 initially sent by the client 205. This makes SYN message 223 appear to middle devices as a retransmission of the message 207, for example due to packet loss or corruption. For example, SYN message 223 may include a source address matching the network address of client 205, the client optional parameters cOpts, a destination address matching the network address of the server 225, and the same TCP sequence number, TCP window size, and window scaling values of message 207. One difference between message 223 and message 207 is the inclusion of inner connection parameters in the TCP options, labeled trpyOpts in example 200.

Upon the receipt of inner connection SYN message 223 by the server transparent network device 220, optionally after passing through middle transparent network device 215, the presence of the inner connection parameters trpyOpts in the TCP options of message 223 indicates to the server transparent network device 220 that the SYN message 223 is intended to open an inner connection with the client transparent network device 210. Had these trpyOpts been absent from the TCP options of message 223, the server transparent network device 220 would interpret this message as a retransmission of the SYN message 207 establishing the outer connection between the client 205 and the server 225.

In response to message 223, the server transparent network device 220 sends a SYN/ACK message 227. To ensure that this SYN/ACK message 227 is not blocked by any middle devices, SYN/ACK message 227 is identical in many respects to the SYN/ACK message 217 initially sent by the server 225. For example, SYN/ACK message 227 may include a source address matching the network address of server 225; the optional server parameters, which may have been previously stored by server transparent network device 220 when processing message 217; a destination address matching the network address of the client 205; and the same TCP sequence number, TCP window size, and window scaling values of message 217. One difference between message 227 and message 217 is the inclusion of inner connection parameters in the TCP options, labeled trpyOpts in example 200.

Upon the receipt of the inner connection SYN/ACK message 227 by client transparent network device 210, an embodiment of client transparent network device 210 forwards the previously received outer connection SYN/ACK message 221 to the client 205 in the form of SYN/ACK message 229. SYN/ACK message 229 may be similar to SYN/ACK message 221, optionally with the transparency parameters proberspOpts removed from the TCP options. Client 205 responds to SYN/ACK message 229 normally, as if it was received directly from the server 225 without passing through transparent network devices 210, 215, or 220, by sending an ACK message 231. ACK message 231 is adapted to indicate to the server 225 that the outer connection between the client 205 and server 225 is established.

In an embodiment, the client transparent network device 210 intercepts the ACK message 231 and generates a combined inner and outer connection ACK message 233. Combined inner and outer connection ACK message 233 is adapted to indicate to the server transparent network device 220 and middle transparent network device 215, if any, that the client 205 has accepted the outer connection from the server 225 and that the inner connection is established with the client transparent network device 210. Combined ACK message 233 is addressed to the server 225 but is intended to be received by the server transparent network device 220. Combined ACK message includes the network address of the client 205 as its source address. Because combined ACK message includes the same source and destination addresses as the ACK message sent by the client 205, it will not be blocked by any middle devices. Combined ACK message 233 includes parameters trpyOpts in its TCP options to indicate to the server transparent network device 220 and optional middle transparent network device 215 that this ACK message 233 is intended to acknowledge the establishment of the inner connection with the client transparent network device 210. In embodiments of the invention, identical or different transparency options may be used by each transparent network device associated with the inner connection.

Upon receiving combined ACK message 233, the server transparent network device 220 recognizes the trpyOpts parameter included in TCP options of the combined ACK message 233. The server transparent network device 220 interprets this parameter in the TCP options as an indication that the inner connection with client transparent network device 210 has been established. In response to the combined ACK message 233, the server transparent network device 220 sends a corresponding ACK message 235, similar to ACK message 231, to the server 225 indicating that the outer connection between the client 205 and the server 225 has been established.

In an alternate embodiment, ACK message 233 is sent following the receipt of SYN/ACK message 227 and prior to sending SYN/ACK message 229.

The first method of establishing an inner connection, as shown in example 200, is able to establish an inner connection transparently because the messages used to establish the inner connection appear to middle devices as typical network traffic. In particular, middle devices interpret the messages 223 and 227 as retransmission of messages 209, 212, 219, and 221 in response to the loss or corruption of the SYN/ACK messages 219 and 221 en route back to the client 205.

Figure 3:
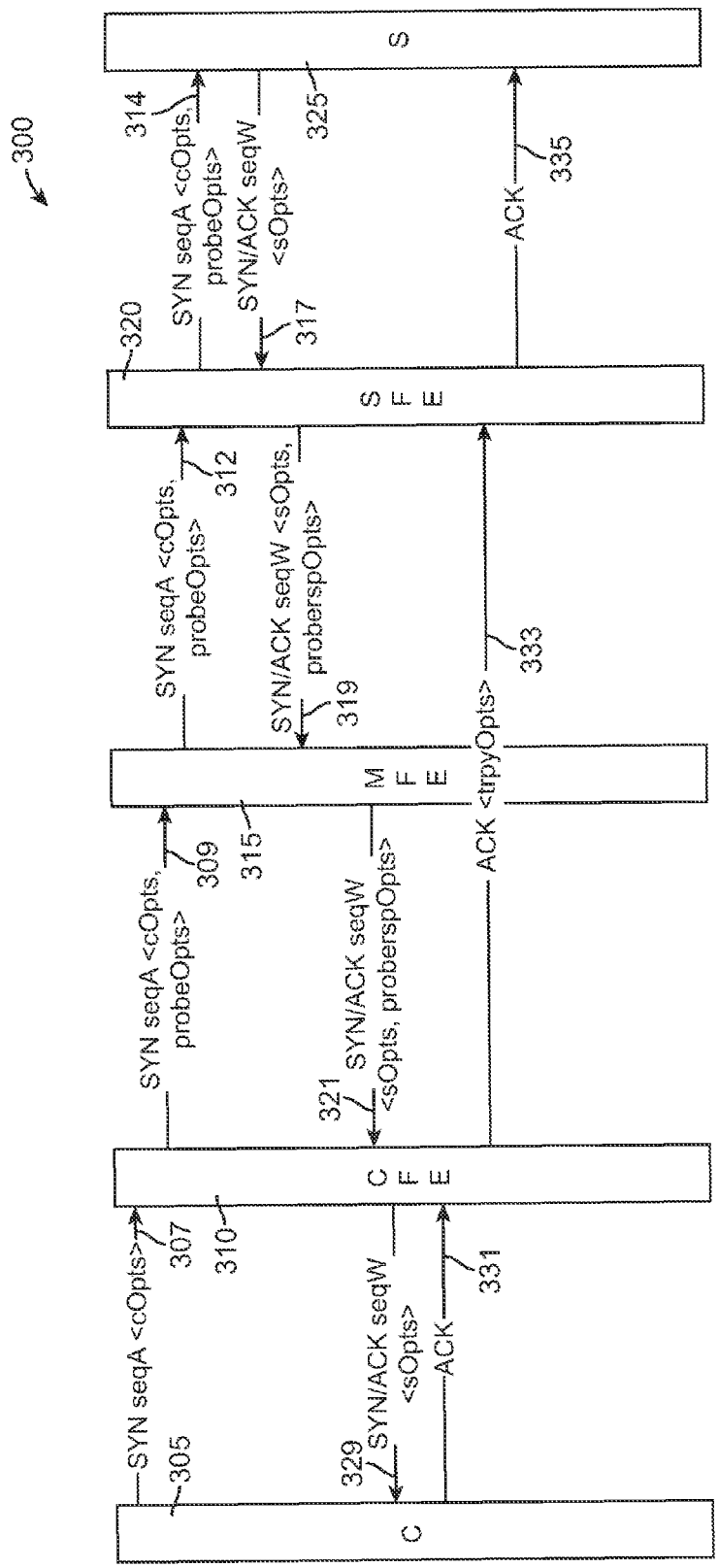
FIG. 3 illustrates a second method of establishing an inner connection between transparent network devices through one or more middle devices according to an embodiment of the invention.

FIG. 3 illustrates an example 300 of a second method of establishing an inner connection between transparent network devices through one or more middle devices according to an embodiment of the invention. Example 300 uses the network traffic between the client and a server used to establish an outer connection to also establish an inner connection between transparent network devices. Although example 300 uses the TCP/IP protocol, other embodiments of the invention may use other network protocols.

Example 300 includes a client 305, such as one of the client systems 120 discussed above, a server 325, such as one of the server systems 145, a client transparent network device 310, a server transparent network device 320, and an optional middle transparent network device 315. One or more middle devices may be located anywhere between the client transparent network device 310 and the server transparent network device 320, including on a client LAN, server LAN, WAN, or other intervening LAN or WAN network.

Example 300 begins with a client 305 sending a SYN message 307 addressed to a server 325. Message 307 is adapted to initiate an outer connection between the client 305 and the server 325. Message 307 includes any client parameters in its TCP options, labeled cOpts in example 300, specified by the client 305. Message 307 is intercepted by the client transparent network device 310, which in response sends a similar SYN message 309 addressed to the server 325. SYN message 309 may also include the network address of the client 305 as its source address, so that message 309 appears to originate from client 305 rather than client transparent network device 310. This allows message 309 to pass through any middle devices. Additionally, SYN message 309 includes TCP options including the cOpts specified by the client 305 as well as additional parameters specified by the client transparent network device 310, which are labeled probeOpts in example 300.

SYN message 309 may be intercepted by middle transparent network device 315, if it is present, which in turn re-emits this message unchanged in the form of SYN message 312. Embodiments of the middle transparent network device 315 may retransmit messages using stateless retransmission or stateful retransmission.

SYN message 309 or 312 is intercepted by the server transparent network device 320. Because of the presence of probeOpts in the received SYN message, the server transparent network device 320 knows that it needs to establish an inner connection with client transparent network device 310. The server transparent network device 320 sends the received SYN message to server 325 in the form of SYN message 314, which may be unchanged from message 312 or may optionally omit the probeOpts included in message 312.

Server 325 treats the received message 314 like a normal connection request from a client and responds accordingly, for example, by sending SYN/ACK message 317 addressed to the client 305. SYN/ACK message 317 includes any server parameters in its TCP options, labeled as sOpts in example 300.

SYN/ACK message 317 is intercepted by server transparent network device 320. In response to message 317, server transparent network device 320 sends a similar SYN/ACK message 319 addressed to the client 305. However, SYN/ACK message 319 includes additional parameters in its TCP options, labeled proberspOpts in example 300, that are provided by the server transparent network device 320. Because the SYN/ACK message 319 includes the same source and destination addresses as the SYN/ACK message 317 sent by the server 325, it will pass through any middle devices without interference.

SYN/ACK message 319 may be intercepted by middle transparent network device 315, if it is present, which in turn re-emits this message unchanged in the form of SYN/ACK message 321. If the middle transparent network device 315 uses stateful retransmission, then SYN/ACK message 319 may modify or discard the associated state maintained by the middle transparent network device 315.

Client transparent network device 310 intercepts either message 319 or 321. Due to the presence of the proberspOpts included by the server transparent network device 320 in this SYN/ACK message, the client transparent network device 310 knows of the existence of the server transparent network device 320 adapted to intercept network traffic between client 305 and server 325. As a result, client transparent network device 310 can establish the inner connection with the server transparent network device 320.

In an embodiment, client transparent network device 310 sends a SYN/ACK message 329 to the client 305. SYN/ACK message 329 may be similar to SYN/ACK message 321, for example including the same source and destination network addresses, any optional server parameters, and the same TCP sequence number, window size, and window scaling factor. SYN/ACK message 329 may optionally omit the transparency parameters proberspOpts from SYN/ACK message 321.

Client 305 responds to SYN/ACK message 329 normally, as if it was received directly from the server 325 without passing through transparent network devices 310, 315, or 320, by sending an ACK message 331. ACK message 331 is adapted to indicate to the server 325 that the outer connection between the client 305 and server 325 is established.

In an embodiment, the client transparent network device 310 intercepts the ACK message 331 and generates a combined inner and outer connection ACK message 333. Combined inner and outer connection ACK message 333 is adapted to indicate to the server transparent network device 320 and middle transparent network device 315, if any, that the client 305 has accepted the outer connection from the server 325 and that the inner connection is established with the client transparent network device 310. Combined ACK message 333 is addressed to the server 325 but is intended to be received by the server transparent network device 320. Combined ACK message includes the network address of the client 305 as its source address. Because combined ACK message includes the same source and destination addresses as the ACK message sent by the client 305, it will not be blocked by any middle devices. Combined ACK message 333 includes TCP options including trpyOpts to indicate to the server transparent network device 320 and optional middle transparent network device 315 that this ACK message 333 is intended to acknowledge the establishment of the inner connection with the client transparent network device 310.

Upon receiving combined ACK message 333, the server transparent network device 320 recognizes the trpyOpts included in the combined ACK message 333. The server transparent network device 320 interprets this parameter included in the TCP options as an indication that the inner connection with client transparent network device 310 has been established. In response to the combined ACK message 333, the server transparent network device 320 sends a corresponding ACK message 335, similar to ACK message 331, to the server 325 indicating that the outer connection between the client 305 and the server 325 has been established.

In an alternate embodiment, ACK message 333 is sent following the receipt of SYN/ACK message 321 and prior to sending SYN/ACK message 329.

The second method of establishing an inner connection, as shown in example 300, is able to establish an inner connection transparently because the messages used to establish the inner connection appear to middle devices as typical network traffic. In particular, some of the messages used to establish a normal outer connection are also used by the transparent network devices to establish an inner connection. Thus, the messages used to establish the inner connection appear to middle devices as establishing an outer connection.

Figure 4:
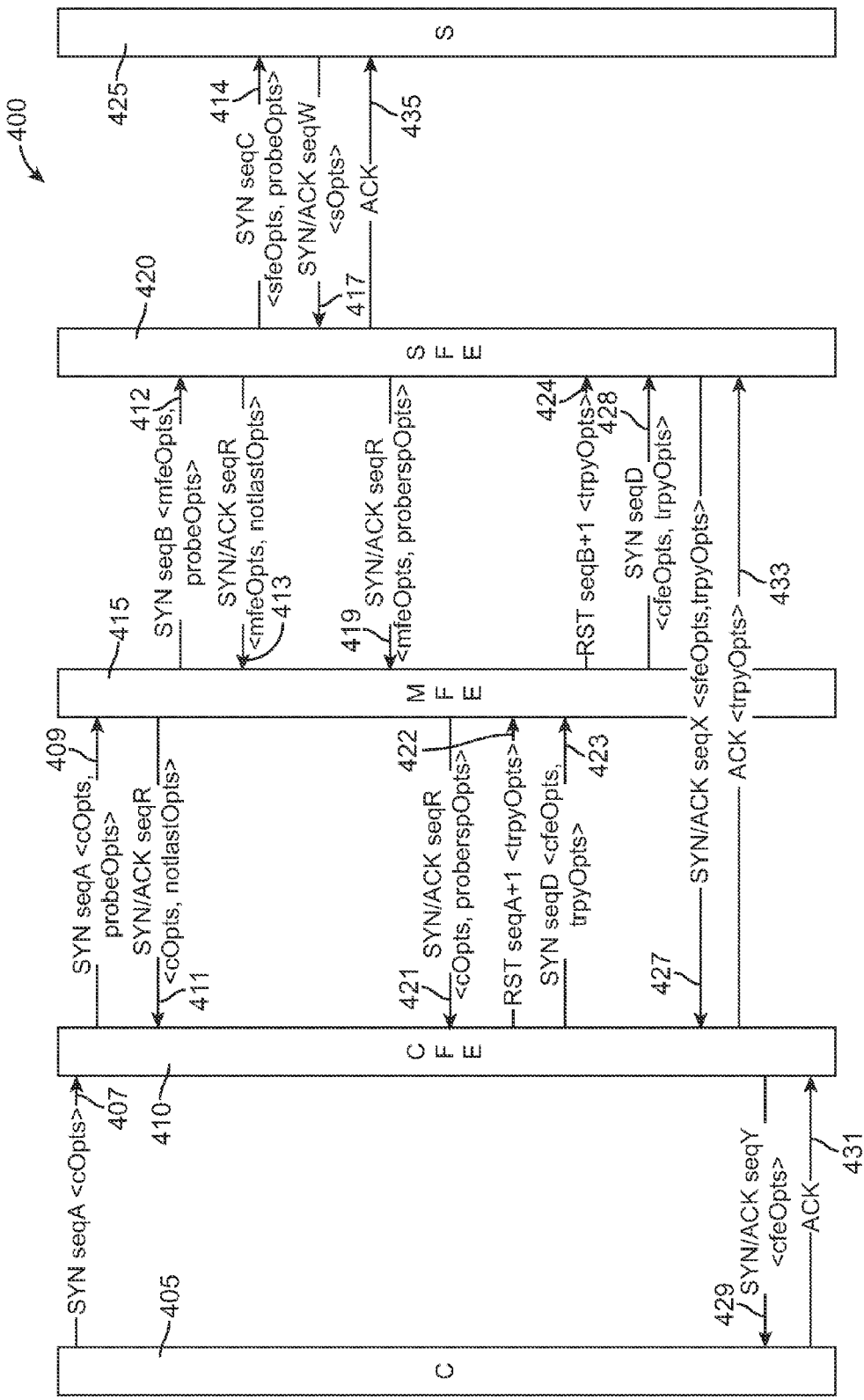
FIG. 4 illustrates a third method of establishing an inner connection between transparent network devices through one or more middle devices according to an embodiment of the invention.

FIG. 4 illustrates an example 400 of a third method of establishing an inner connection between transparent network devices through one or more middle devices according to an embodiment of the invention. Example 400 acknowledges the SYN messages establishing the outer connection at each transparent network device on the network between the client and the server. Once the arrangement of transparent network devices between the client and the server is determined via this process, the transparent network devices reset the network connection between the client and a server to allow for the establishment of an inner channel connection between transparent network devices. Although example 400 uses the TCP/IP protocol, other embodiments of the invention may use other network protocols.

Example 400 includes a client 405, such as one of the client systems 120 discussed above, a server 425, such as one of the server systems 145, a client transparent network device 410, a server transparent network device 420, and an optional middle transparent network device 415. One or more middle devices may be located anywhere between the client transparent network device 410 and the server transparent network device 420, including on a client LAN, server LAN, WAN, or other intervening LAN or WAN networks.

Example 400 begins with a client 405 sending a SYN message 407 addressed to a server 425. Message 407 is adapted to initiate a connection between the client 405 and the server 425, referred to as an outer connection. Message 407 includes any optional client parameters in its TCP options, labeled cOpts in example 400, and a TCP sequence number specified by the client 405.

Message 407 is intercepted by the client transparent network device 410, which in response sends a similar SYN message 409 addressed to the server 425. SYN message 409 may also include the network address of the client 405 as its source address, so that message 409 appears to originate from client 405 rather than client transparent network device 410. Additionally, SYN message 409 includes the optional cOpts specified by the client 405 as well as additional parameters in its TCP options specified by the client transparent network device 410, which are labeled probeOpts in example 400.

SYN message 409 may be intercepted by middle transparent network device 415, if it is present, which in returns a SYN/ACK message 411 includes parameters notlastOpts in its TCP options adapted to notify the client transparent network device 410 that the middle transparent network device 415 is not the last transparent network device between the client 405 and the server 425. Following message 411, an embodiment of the middle transparent network device 415 retransmits SYN message 409 in the form of SYN message 412. Message 412 may include a different TCP sequence number, specified by the middle transparent network device 415, than message 409. In an embodiment, message 412 also includes middle transparent network device parameters in its TCP options, labeled mfeOpts in example 400, adapted to indicate the parameters used by the middle transparent network device 415.

SYN message 409 or 412 is intercepted by the server transparent network device 420. Because of the presence of the probeOpts parameter in the TCP options of the received SYN message, the server transparent network device 420 knows that it needs to establish a connection with client transparent network device 410, referred to as an inner connection.

The server transparent network device 420 sends a first SYN/ACK message 413 addressed to the client 405. SYN/ACK message 413 includes the notlastOpts parameter in its TCP options adapted to notify the nearest transparent network device, which is either the middle transparent network device 415 or the client transparent network device 410, that the server transparent network device 420 is attempting to establish the outer connection with the server 425.

Following SYN/ACK message 413, the server transparent network device 420 sends the received SYN message to server 425 in the form of SYN message 414, which may be unchanged from message 412 or may optionally omit the probeOpts parameter included in the TCP options of message 412. In an embodiment, SYN message 414 includes a different TCP sequence number than that in SYN message 407 sent by client 405 or SYN message 412 sent by middle transparent network device 415. As discussed in detail below, the client transparent network device 410, middle transparent network device 415, and the server transparent network device 420 will change sequence numbers of network traffic between the client 405 and the server 425 as needed.

Server 425 treats the received message 414 like a normal connection request from a client and responds accordingly, for example, by sending SYN/ACK message 417 addressed to the client 405. SYN/ACK message 417 includes any server parameters, labeled as sOpts in example 400, in its TCP options.

The server transparent network device 420 intercepts the SYN/ACK message 417 from the server 425. In response to SYN/ACK message 417, the server transparent network device 420 sends an ACK message 435 back to the server 425. ACK message 435 is adapted to appear as if it came from the client 405 directly, for example by including the network address of the client 405 as its source address. At this point, the server believes that it has successfully established an outer connection with the client.

Additionally, in response to message 417, server transparent network device 420 sends a similar SYN/ACK message 419 addressed to the client 405. However, SYN/ACK message 419 includes TCP options including mfeOpts parameters, previously specified by message 412, and additional parameters, labeled proberspOpts in example 400, that are provided by the server transparent network device 420.

SYN/ACK message 419 is intercepted by middle transparent network device 415, if it is present, which in turn re-emits this message in the form of SYN/ACK message 421. SYN/ACK message 421 is addressed and configured similarly to SYN/ACK message 419, with the mfeOpts parameters replaced with the cOpts parameters previously sent by the client 405 in the TCP options.

Client transparent network device 410 either intercepts message 419, if there is no middle transparent network device, or 421, if there is middle transparent network device. Due to the presence of the proberspOpts parameter included by the server transparent network device 420 in the TCP options of this SYN/ACK message, the client transparent network device 410 knows of the existence of the server transparent network device 420 adapted to intercept network traffic between client 405 and server 425. As a result, client transparent network device 410 can initiate the establishment of the inner connection between client transparent network device 410 and server transparent network device 420.

In an embodiment, the client transparent network device 410 initiates the inner connection by sending a RST message 422. RST message 422 is adapted to reset the network connection between the client 405 and server 425. Any middle devices intercepting network traffic between client transparent network device 410 and middle transparent network device 415 will receive RST message 422 and reset the connection initiated by SYN message 409.

After resetting the connection through any middle devices between client transparent network device 410 and middle transparent network device 415, RST message 422 is received by middle transparent network device 415. Because RST message 422 includes a transparency parameter trpyOpts in its TCP options, middle transparent network device 415 understands that this RST message is intended to reset connections for any intervening middle devices and is not intended to reset the process of establishing an inner connection between the client transparent network device 410, middle transparent network device 415, and server transparent network device 420. As a result, middle transparent network device 415 does not forward this RST message 422 any further.

Following the RST message 422, client transparent network device 410 sends a second SYN message 423 to establish an inner connection between the client transparent network device 410, the middle transparent network device 415, and the server transparent network device 420. SYN message 423 is identical in many respects to the SYN message 407 initially sent by the client 405. This makes SYN message 423 appear to middle devices as a retransmission of the message 407, for example due to packet loss or corruption. For example, SYN message 423 may include a source address matching the network address of client 405, and a destination address matching the network address of the server 425. However, SYN message 423 differs from SYN message 409 with the inclusion of client transparent network device parameters cfeOpts, transparency parameters, a different TCP sequence number than SYN message 409, and optionally different TCP window sizes and window scaling values.

Upon the receipt of inner connection SYN message 423 by the middle transparent network device 415, the middle transparent network device 415 recognizes that this SYN message 423 is intended to open an inner connection between the client and server transparent network devices 410 and 420 due to the presence of the trpyOpts parameters in its TCP option. In response to SYN message 423, middle transparent network device 415 sends a RST message 424 addressed to the server 425. Any middle devices intercepting network traffic between middle transparent network device 415 and server transparent network device 420 will receive RST message 424 and reset the connection initiated by SYN message 412.

Following the RST message 424, middle transparent network device 415 sends a second SYN message 428 to establish an inner connection between the client transparent network device 410 and the server transparent network device 420. In an embodiment, SYN message 428 may be identical to the SYN message 423 previously sent by client transparent network device 410.

Upon the receipt of inner connection SYN message 428 by the server transparent network device 420, optionally after passing through middle transparent network device 415, the presence of the inner connection parameters trpyOpts in its TCP options indicates to the server transparent network device 420 that the SYN message 428 is intended to open an inner connection with the client transparent network device 410. Had these trpyOpts been absent, the server transparent network device 420 would interpret this message as a retransmission of the SYN message 407 establishing the outer connection between the client 405 and the server 425.

In response to message 428, the server transparent network device 420 sends a SYN/ACK message 427. To ensure that this SYN/ACK message 427 is not blocked by any middle devices, SYN/ACK message 427 is identical in many respects to the SYN/ACK message 417 initially sent by the server 425. For example, SYN/ACK message 427 may include a source address matching the network address of server 425 and a destination address matching the network address of the client 405. SYN/ACK message 427 includes server transparent network device parameters sfeOpts in its TCP options, a different TCP sequence number than SYN/ACK message 413, and optionally different TCP options.

Upon the receipt of the inner connection SYN/ACK message 427 by client transparent network device 410, an embodiment of client transparent network device 410 sends an ACK message 433. ACK message 433 includes the trpyOpts parameters in its TCP options to indicate to the server transparent network device 420 and middle transparent network device 415 that the inner connection is established with the client transparent network device 410. ACK message 433 is addressed to the server 425 but is intended to be received by the server transparent network device 420.

Upon the receipt of the inner connection SYN/ACK message 427 by client transparent network device 410, an embodiment of client transparent network device 410 sends a SYN/ACK message 429 to client 405. This indicates to the client 405 that an outer connection with the server 425 has been established. Client 405 responds to SYN/ACK message 429 normally, as if it was received directly from the server 425 without passing through transparent network devices 410, 415, or 420, by sending an ACK message 431. ACK message 431 is adapted to indicate to the server 425 that the outer connection between the client 405 and server 425 is established. ACK message 431 is intercepted by client transparent network device 410, indicating to the client transparent network device 410 that the client 405 has accepted this outer connection.

Figure 5:
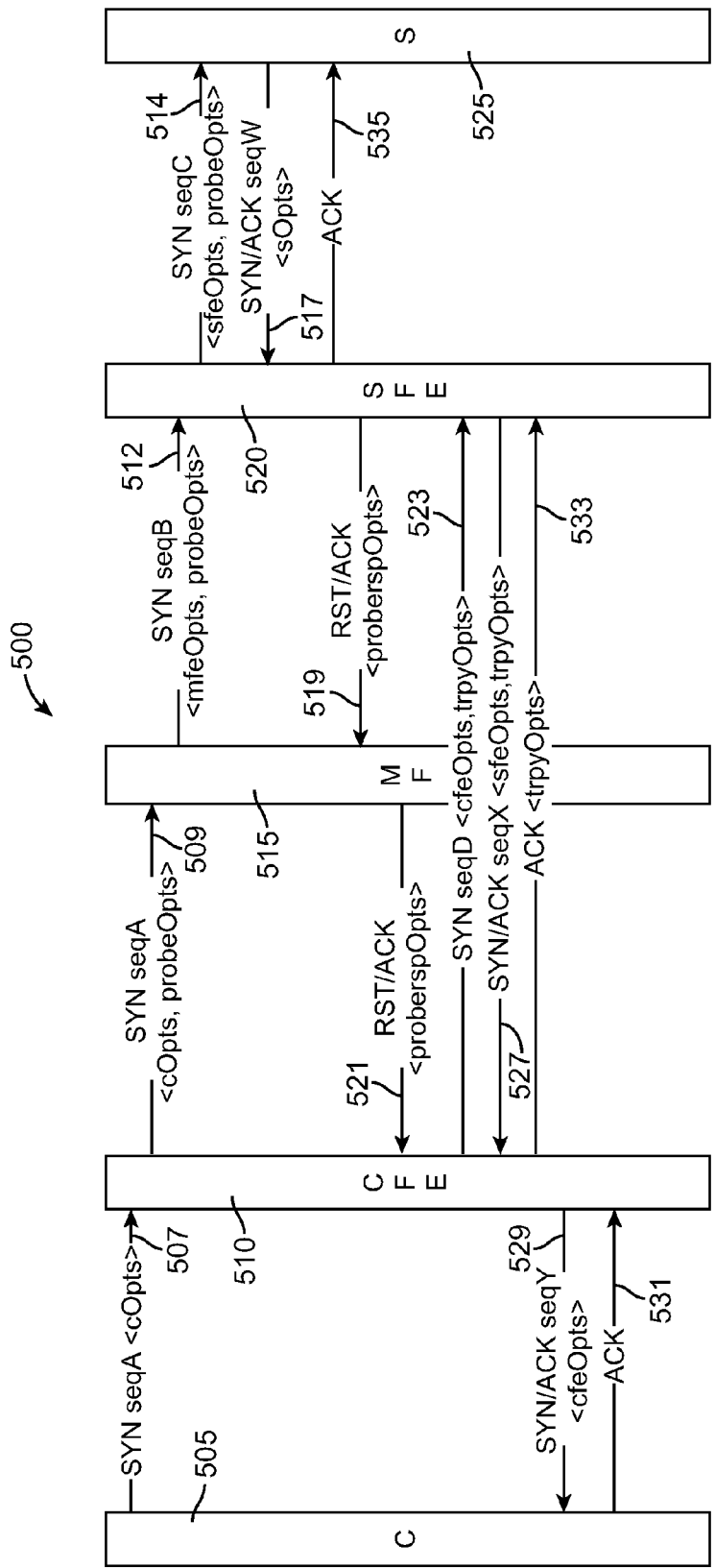
FIG. 5 illustrates a fourth method of establishing an inner connection between transparent network devices through one or more middle devices according to an embodiment of the invention.

FIG. 5 illustrates an example 500 of a fourth method of establishing an inner connection between transparent network devices through one or more middle devices according to an embodiment of the invention. Like example 400, example 500 resets the network connection between the client and a server to allow for the establishment of an inner channel connection between transparent network devices. Although example 500 uses the TCP/IP protocol, other embodiments of the invention may use other network protocols.

Example 500 includes a client 505, such as one of the client systems 120 discussed above, a server 525, such as one of the server systems 145, a client transparent network device 510, a server transparent network device 520, and an optional middle transparent network device 515. One or more middle devices may be located anywhere between the client transparent network device 510 and the server transparent network device 520, including on a client LAN, server LAN, WAN, or other intervening LAN or WAN networks.

Example 500 begins with a client 505 sending a SYN message 507 addressed to a server 525. Message 507 is adapted to initiate a connection between the client 505 and the server 525, referred to as an outer connection. Message 507 includes any optional client parameters, labeled cOpts in example 500, and a TCP sequence number specified by the client 505.

Message 507 is intercepted by the client transparent network device 510, which in response sends a similar SYN message 509 addressed to the server 525. SYN message 509 may also include the network address of the client 505 as its source address, so that message 509 appears to originate with client 505 rather than client transparent network device 510. Additionally, SYN message 509 includes TCP options including the cOpts parameters specified by the client 505 as well as additional parameters specified by the client transparent network device 510, which are labeled probeOpts in example 500.

SYN message 509 may be intercepted by middle transparent network device 515, if it is present, which in turn re-emits this message in the form of SYN message 512. Message 512 may include a different TCP sequence number, specified by the middle transparent network device 515, than message 509. Embodiments of the middle transparent network device 515 may retransmit messages using stateless retransmission or stateful retransmission.

SYN message 509 or 512 is intercepted by the server transparent network device 520. Because of the presence of the probeOpts parameter in the TCP option in the received SYN message, the server transparent network device 520 knows that it needs to establish a connection with client transparent network device 510 and optionally middle transparent network device 515, referred to as an inner connection.

The server transparent network device 520 sends the received SYN message to server 525 in the form of SYN message 514, which may be unchanged from message 512 or may optionally omit the probeOpts parameter included in message 512. In an embodiment, SYN message 514 includes a different TCP sequence number than that in SYN message 507 sent by client 505 or in SYN message 512 sent by middle transparent network device 515. As discussed in detail below, the client transparent network device 510, middle transparent network device 515, and the server transparent network device 520 will change sequence numbers of network traffic between the client 505 and the server 525 as needed.

Server 525 treats the received message 514 like a normal connection request from a client and responds accordingly, for example, by sending SYN/ACK message 517 addressed to the client 505. SYN/ACK message 517 includes any optional server parameters, labeled as sOpts in example 500.

The server transparent network device 520 intercepts the SYN/ACK message 517 from the server 525. In response to SYN/ACK message 527, the server transparent network device 520 sends an ACK message 535 back to the server 525. ACK message 535 is adapted to appear as if it came from the client 505 directly, for example by including the network address of the client 505 as its source address. At this point, the server believes that it has successfully established an outer connection with the client.

Additionally, in response to message 517, server transparent network device 520 sends a RST/ACK message 519 addressed to the client 505. RST/ACK message 519 includes parameters in the TCP options, labeled proberspOpts in example 500, that are provided by the server transparent network device 520.

RST/ACK message 519 is intercepted by middle transparent network device 515, if it is present, which in turn re-emits this message in the form of RST/ACK message 521. RST/ACK message 521 is addressed and configured similarly to SYN/ACK message 519.

Client transparent network device 510 either intercepts message 519, if there is no middle transparent network device, or 521, if there is middle transparent network device. Due to the presence of the proberspOpts parameters included by the server transparent network device 520 in the intercepted RST/ACK message, the client transparent network device 510 knows of the existence of the server transparent network device 520 adapted to intercept network traffic between client 505 and server 525. As a result, client transparent network device 510 can initiate the establishment of the inner connection between client transparent network device 510 and server transparent network device 520.

In an embodiment, RST/ACK messages 519 and 521 are adapted to reset the network connection between the client 505 and server 525. Any middle devices that intercept these RST/ACK messages 519 and 521 will reset their state information concerning this network connection. This will allow the transparent network device to set up their inner connection using similar parameters without interference from middle devices. Additionally, the client transparent network device 510 will intercept the RST/ACK message 519 or 521 and prevent them from reaching the client 505. Thus, client 505 and server 525 will still believe they have established a valid outer connection with each other.

Following the RST/ACK message 519 or 521, client transparent network device 510 sends a second SYN message 523 to establish an inner connection between the client transparent network device 510, the optional middle transparent network device 515, and the server transparent network device 520. SYN message 523 is identical in many respects to the SYN message 507 initially sent by the client 505. This makes SYN message 523 appear to middle devices as the re-establishment of an outer connection between the client 505 and the server 525, for example due to an application error. For example, SYN message 523 may include a source address matching the network address of client 505 and a destination address matching the network address of the server 525. However, SYN message 523 differs from SYN message 509 with the inclusion of TCP options including client transparent network device parameters cfeOpts and trpyOpts parameters, a different TCP sequence number than SYN message 509, and optionally other different TCP options.

Upon the receipt of inner connection SYN message 523 by the server transparent network device 520, optionally after passing through middle transparent network device 515, the presence of the inner connection trpyOpts parameters included in the TCP options indicates to the server transparent network device 520 that the SYN message 523 is intended to open an inner connection with the client transparent network device 510. Had these trpyOpts parameters been absent from the TCP options, the server transparent network device 520 would interpret this message 523 as the re-establishment of the outer connection between the client 505 and the server 525.

In response to message 523, the server transparent network device 520 sends a SYN/ACK message 527. To ensure that this SYN/ACK message 527 is not blocked by any middle devices, SYN/ACK message 527 is identical in many respects to the SYN/ACK message 517 initially sent by the server 525. For example, SYN/ACK message 527 may include a source address matching the network address of server 525 and a destination address matching the network address of the client 505. SYN/ACK message 527 includes server transparent network device parameters sfeOpts, a different TCP sequence number, and optionally TCP window size and window scaling values.

Upon the receipt of the inner connection SYN/ACK message 527 by client transparent network device 510, an embodiment of client transparent network device 510 sends an ACK message 533. ACK message 533 includes the trpyOpts parameters in the TCP options to indicate to the server transparent network device 520 and middle transparent network device 515 that the inner connection is established with the client transparent network device 510. ACK message 533 is addressed to the server 525 but is intended to be received by the server transparent network device 520.

Additionally, upon the receipt of the inner connection SYN/ACK message 527 by client transparent network device 510, an embodiment of client transparent network device 510 sends a SYN/ACK message 529 to client 505. This indicates to the client 505 that an outer connection with the server 525 has been established. Client 505 responds to SYN/ACK message 529 normally, as if it was received directly from the server 525 without passing through transparent network devices 510, 515, or 520, by sending an ACK message 531. ACK message 531 is adapted to indicate to the server 525 that the outer connection between the client 505 and server 525 is established. ACK message 531 is intercepted by client transparent network device 510, indicating to the client transparent network device 510 that the client 505 has accepted this outer connection.

The third and fourth methods of establishing an inner connection, as shown in examples 400 and 500, are able to establish an inner connection transparently because the messages used to establish the inner connection appear to middle devices as typical network traffic. In particular, the messages used to establish the inner connection between transparent network devices appears to middle devices as the re-establishment of an outer connection following a reset of the outer connection.

Figure 6:
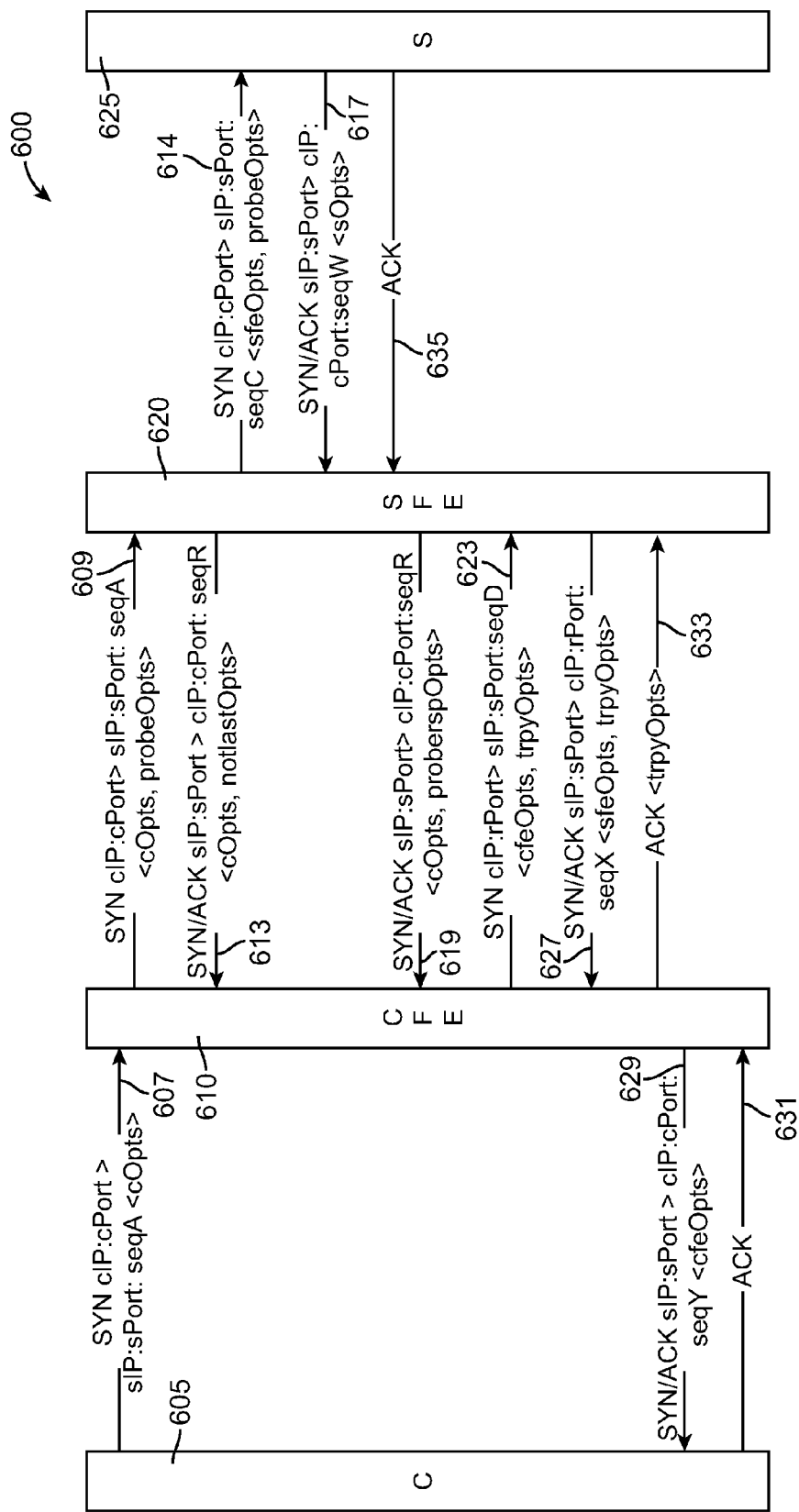
FIG. 6 illustrates a fifth method of establishing an inner connection between transparent network devices through one or more middle devices according to an embodiment of the invention.

Examples 100, 200, 300, 400, and 500 illustrate different methods of establishing inner connections between transparent network devices through one or more middle devices according to embodiments of the invention. FIG. 6 illustrates an example 600 of a sixth method of establishing an inner connection between transparent network devices through one or more middle devices according to an embodiment of the invention. In example 600, the transparent network devices set up their inner connection using the same network addresses as the client and server, but with different network ports. In this embodiment, the transparent network devices are not truly transparent, because the outer connection and inner connection are using different network ports. Middle devices may see both the inner and outer connections.

Example 600 includes a client 605, such as one of the client systems 120 discussed above, a server 625, such as one of the server systems 145, a client transparent network device 610 and a server transparent network device 620. A middle transparent network device and/or one or more middle devices may be located anywhere between the client transparent network device 610 and the server transparent network device 620, including on a client LAN, server LAN, WAN, or other intervening LAN or WAN network. Although example 600 uses the TCP/IP protocol, other embodiments of the invention may use other network protocols.

Example 600 begins with a client 605 sending a SYN message 607 addressed to a server 625. In example 600, the client 605 is associated with a client network address (cIP) and a client network port (cPort). Similarly, the server 625 is associated with a server network address (sIP) and a server network port (sPort). Message 607 is adapted to initiate an outer connection between the client 605 and the server 625. Message 607 includes TCP options including any optional client parameters, labeled cOpts in example 600, specified by the client 605. In this embodiment, the client specifies a first pair of client and server connection ports to be used to communicate network traffic in the outer connection. Message 607 is intercepted by the client transparent network device 610, which in response sends a similar SYN message 609 addressed to the server 625. SYN message 609 may also include the network address of the client 605 as its source address, so that message 609 appears to originate with client 605 rather than client transparent network device 610. Additionally, SYN message 609 includes TCP options including the cOpts parameters specified by the client 605 as well as additional TCP options specified by the client transparent network device 610, which are labeled probeOpts in example 600.

SYN message 609 is intercepted by the server transparent network device 620. Because of the presence of probeOpts in the TCP options of the received SYN message, the server transparent network device 620 knows that it needs to establish an inner connection with client transparent network device 610. The server transparent network device 620 responds to SYN message 609 by sending a SYN/ACK message 613 addressed to the client 605. SYN/ACK message 613 includes additional parameters in the TCP options, labeled notlastOpts in example 600. The notlastOpts parameters in the TCP options included in SYN/ACK message 613 are adapted to indicate to the client transparent network device 610 that an additional SYN/ACK message will be sent by the server transparent network device 620 upon the successful establishment of an outer connection with server 625.

Additionally, the server transparent network device 620 responds to SYN message 609 by sending the received SYN message to server 625 in the form of SYN message 614, which may be unchanged from message 612 or may optionally omit the probeOpts included in message 612.

Server 625 treats the received message 614 like a normal connection request from a client and responds accordingly, for example, by sending SYN/ACK message 617 addressed to the client 605. SYN/ACK message 617 includes TCP options including any optional server parameters, labeled as sOpts in example 600. SYN/ACK message is addressed to the client 605 via its specified network address and connection port.

SYN/ACK message 617 is intercepted by server transparent network device 620. In response to the SYN/ACK message 617, the server transparent network device 620 sends a corresponding ACK message 635 to the server 625 indicating that the outer connection between the client 605 and the server 625 has been established.

Additionally, in response to SYN/ACK message 617, the server transparent network device 620 sends a second SYN/ACK message 619 addressed to the client 605. SYN/ACK message 619 includes TCP options including server transparent network device parameters, labeled proberspOpts in example 600. The proberspOpts parameters included in the TCP options in SYN/ACK message 619 are adapted to indicate to the client transparent network device 610 that an outer connection with server 625 has been established and the server transparent network device 620 is ready to establish an inner connection.

Client transparent network device 610 intercepts message 619 and initiates the establishment of the inner connection between client transparent network device 610 and server transparent network device 620 in response to the presence of the proberspOpts parameters in the TCP options in message 619.

In an embodiment, the client transparent network device 610 initiates the inner connection by sending a SYN message 623. SYN message 623 may include a source address matching the network address of client 605 and a destination address matching the network address of the server 625. However, SYN message 623 includes a different client connection port, a different TCP sequence number, and optionally different TCP window size and window scaling values than used in message 607. An additional difference between SYN messages 623 and 607 is the inclusion in the TCP options of inner connection parameters, labeled trpyOpts, and optional client transparent network device parameters, labeled cfeOpts.

Upon the receipt of inner connection SYN message 623 by the server transparent network device 620, the presence of the inner connection parameters trpyOpts indicates to the server transparent network device 620 that the SYN message 623 is intended to open an inner connection with the client transparent network device 610.

In response to message 623, the server transparent network device 620 sends a SYN/ACK message 627. For example, SYN/ACK message 627 may include a source address matching the network address of server 625 and a destination address matching the network address of the client 605. SYN/ACK message 627 also includes TCP options including the inner connection parameters trpyOpts, and server transparent network device parameters, labeled sfeOpts in example 600.

Upon the receipt of the inner connection SYN/ACK message 627 by client transparent network device 610, client transparent network device 610 sends an ACK message 633 to the server 625. ACK message 633 includes the trpyOpts parameters in its TCP options to indicate to the server transparent network device 620 that the inner connection is established with the client transparent network device 610.

Additionally, client transparent network device 610 responds to SYN/ACK message 627 by sending a version of the outer connection SYN/ACK message 617 to the client 605 in the form of SYN/ACK message 629. SYN/ACK message 629 may be similar to SYN/ACK message 617, optionally including the client transparent network device parameters cfeOpts. Client 605 responds to SYN/ACK message 629 normally, as if it was received directly from the server 625 without passing through transparent network devices 610, 615, or 620, by sending an ACK message 631. ACK message 631 is adapted to indicate to the server 625 that the outer connection between the client 605 and server 625 is established. The client transparent network device 610 intercepts the ACK message 631, which indicates that the client 605 has accepted to outer connection with the server 625.

At this point, the client 605 and the server 625 are ready to communicate with each other via the established outer connection. Additionally, the client transparent network device 610 and server transparent network device 620 are ready to communicate with each other via the established inner connection.

In further embodiments of the methods illustrated by examples 100, 200, 300, 400, 500, and 600, transparent network devices may allow passthrough network traffic between the client and server. In these embodiments, a client transparent network device intercepting passthrough network traffic from a client or a server transparent network device intercepting passthrough network traffic from the server may need to modify the connection ports of the passthrough network traffic to match the connection ports used by the inner connection. The modified passthrough network traffic may then be sent via the inner connection to its counterpart transparent network device. Upon receiving passthrough network traffic via the inner connection, a transparent network device may modify the connection ports of the passthrough network traffic to match the connection ports used by the client and server in the outer connection.

In some implementations, different TCP sequence numbers are used by the client and server for their respective portions of the outer connection. In example 400, client 405 sends messages to the server 425 using a TCP sequence beginning with sequence number seqA, which can be any arbitrary valid TCP sequence number. Client 405 expects to receive messages from the server 425 using a TCP sequence beginning with sequence number seqY, which can also be any arbitrary valid TCP sequence number. Similarly, server 425 expects to receive messages from client 405 beginning with arbitrary sequence number seqC and sends messages to the client 405 beginning with arbitrary sequence number seqW. Because messages never travel directly between client 405 and server 425, this mismatch in sequence numbers has no effect on the operation of the outer connection.

If different TCP sequence numbers are used by the client and server for their respective portions of the outer connection, embodiments of invention that include passthrough network traffic may modify the sequence numbers of passthrough network traffic to eliminate this mismatch and prevent the client and server from rejecting the passthrough network traffic as out of sequence. In an embodiment, a server transparent network device renumbers the sequence numbers of passthrough network traffic received from the client so that its sequence numbers begin with the sequence number expected by the server, such as seqC rather than seqA in example 400. This may be done by determining a difference between the initial sequence values by the different portions of the outer connection and adding this difference to the sequence numbers of network traffic received from the client. Similarly, a client transparent network device modifies the sequence numbers of network traffic received from server so that this network traffic begins with the sequence number expected by the client, such as seqY rather than seqW in example 400.

In further embodiments, middle transparent network device may also modify sequence numbers of passthrough network traffic as needed to match sequence numbers used by the portions of the inner connection between the client transparent network device and server transparent network device. For example, a client transparent network device and a middle transparent network device may use sequences initialized to seqA and seqB, respectively, for a first portion of the inner connection. Similarly, the middle transparent network device and a server transparent network device may use sequences initialized to seqC and seqD, respectively, for a second portion of the inner connection. If the transparent network devices allow outer connection passthrough traffic between a client and a server, the sequence numbers used by the passthrough network traffic may be modified by the client transparent network device, middle transparent network device, and server transparent network device as needed so that sequence numbers and/or network ports match the requirements of each portion of the inner connection and outer connection.

As discussed above, communications between transparent network devices is vulnerable to several problems. First, middle devices, such as firewalls, proxies, network address translation (NAT) devices, can mistakenly block or misdirect communications between transparent network devices, interfering with the establishment and operation of an inner channel between transparent network devices. The methods illustrated by examples 100, 200, 300, 400, 500, and 600 enable transparent devices to establish inner connections without disruption by middle devices according to embodiments of the invention.

Data corruption is an additional communications problem associated with transparent network devices Inner connection network traffic is addressed to a client or server device, but is intended to be intercepted by a transparent network device before reaching its destination. This interception allows transparent network devices to communicate with each other using the same network addresses as the client and server.

However, inner connection network traffic may not always be intercepted by the intended transparent network device. For example, inner connection network traffic may be routed towards its specified destination (e.g. a client or server) along a network path that does not include the intended network device. This may occur for reasons including routing changes and network device failures. As a result, inner channel network traffic may bypass the intended transparent network device and accidentally reach its addressed destination. If the receiving computer or network device accepts the inner channel network packet, it may misinterpret the data intended for the transparent network device as its own data, resulting in errors or data corruption.

One approach to preventing data corruption due to non-intercepted network traffic is to modify inner connection network traffic so that it appears invalid to non-transparent network devices, such as a client or server. One embodiment of this approach modifies the checksum or error detection field of each inner connection network packet or other data communications entity, so that it appears that the network packet data is corrupt. For example, a server transparent network device using TCP may set the TCP checksum of an inner channel network packet to a different value than that required by the protocol. If this network packet inadvertently reaches its addressed destination, such as a client, instead of its intended destination, such as a client transparent network device, the receiving device will reject this network packet due to the TCP checksum not matching the value expected for the network packet data.

In a further embodiment, the checksum or error detection field of each inner channel network packet is modified in a manner known to the transparent devices. In this embodiment, inner connection network packets inadvertently received by their addressed destination devices will be rejected for having checksums that do not match their data according to the communications protocol. However, transparent devices that know the manner in which inner connection network packets' checksums have been modified will be able to verify the validity of the data in inner connection network packets.

For example, a server transparent network device may modify the TCP checksum of an inner connection network packet by inverting some or all of its bits, performing a Boolean, arithmetic, or other reversible mathematical operation, or by applying a different error detection and/or correction technique. If this inner connection packet is inadvertently received by its addressed destination device, such as a client, it will be rejected as corrupt because its TCP checksum value does not match the value specified by the protocol for the packet data. However, if the inner connection network packet is intercepted by a transparent network device, such as a client transparent network device, as intended, the transparent network device can reverse the modification of the TCP checksum of this network packet and correctly determine whether the packet data is valid or corrupt.

Still another embodiment of this approach sets the fragment indicators of inner connection network packets or other data communication entities so that so that it appears that inner connection network packets are fragmented. If an inner connection network packet with this modification is inadvertently received by its addressed destination network device, this network device will hold this packet in a buffer until a remaining portion of the inner connection packet is received. However, because this inner connection packet is not really fragmented, this remaining portion of the inner connection packet does not exist and thus will never arrive at the addressed destination network device. Eventually, this network device will assume that the remaining portion of this packet was lost and will delete this inner connection network packet from its buffer.

Conversely, if an inner connection network packet is intercepted by its intended destination of the transparent network device, the transparent network device will know to ignore this fragment indicator and will process the inner connection packet immediately.

In yet another approach to preventing data corruption, embodiments of the invention use different flow control receive windows for network traffic associated with the inner and outer connections. In general, TCP connections are associated with an initial sequence number and receive window. Each network packet is generally assigned the next available sequence number. Because network packets may arrive out of order, a network device will accept any network packet having a sequence number within a specified range, referred to as the receive window, of the highest recently accepted sequence number. Network packets having sequence numbers outside of the receive window will be rejected by the network device.

For example, if a network device initiates its connection with an initial sequence number of A and a window size of 1000, the network device will accept any network packet with a sequence number between A+1 and A+999. If a network packet with a sequence number of A+500 is received and accepted, then the window of the network device is advanced and the network device will accept network traffic with a sequence number less than A+1499.

Embodiments of the invention prevent data corruption by assigning different initial sequence values to the inner and outer connections. For example, an outer connection may be assigned an initial sequence number of 1000 and a window size of 10000. The inner connection may be assigned an initial sequence number of 500000 and a window size of 10000. Thus, any inner connection network traffic that is inadvertently received by a client, server, or other outer connection device will be rejected for having a sequence number outside of the outer connection's receive window.

With this approach, if the transparent network devices output the same number of network packets as the outer connection devices, then the receive windows of the outer and inner connections will remain far apart, preventing data corruption. However, some transparent network devices, such as WAN accelerator devices, send fewer network packets in their inner connections than in their associated outer connections. In the case of WAN accelerator devices, this is due to the data compression and optimization performed by the WAN accelerator to reduce the amount of data to be communicated via a WAN. Other transparent network devices may send more network traffic via its inner connection than in their associated outer connections. In either case, the receive window of the outer connection will eventually "catch up" to and overlap the receive window of the inner connection. When these receive windows partially or entirely overlap, there is a chance that inner connection network traffic inadvertently received by an outer connection device will be mistakenly accepted, because the sequence numbers of the inner connection network packets are within the outer connection receive windows.

Figure 7:
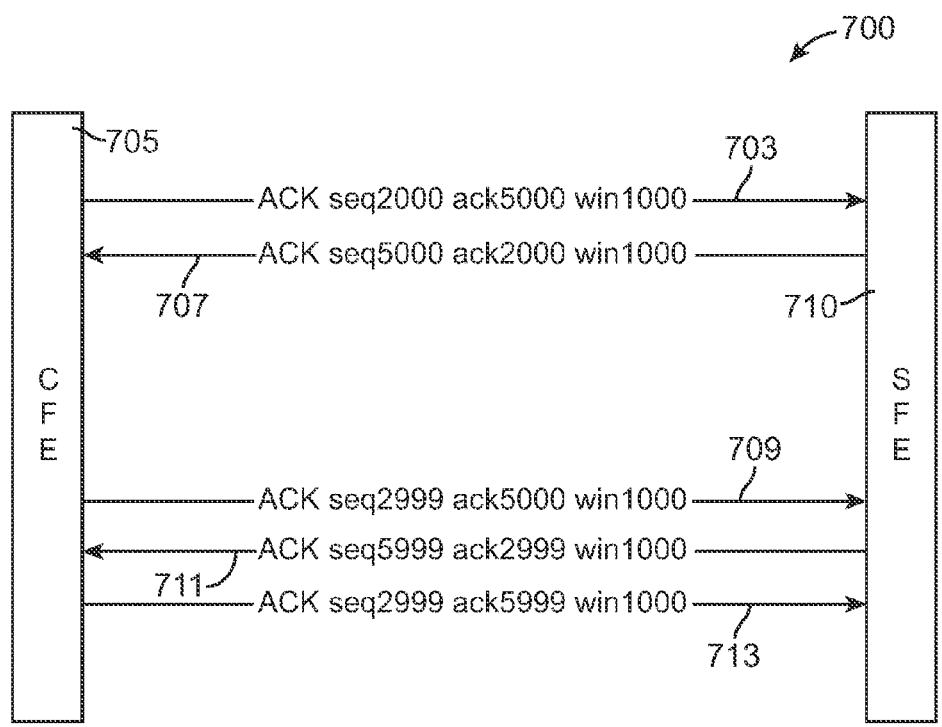
FIG. 7 illustrates a window jump method of preventing data corruption when using an inner connection between transparent network devices according to an embodiment of the invention.

Embodiments of the invention using different sequence numbers and receive windows to prevent data corruption may use several approaches to prevent inner and outer connection receive windows from overlapping. FIG. 7 illustrates an example 700 of a window jump method of preventing data corruption when using an inner connection between transparent network devices according to an embodiment of the invention. Example 700 includes a client transparent network device 705 and a server transparent network device 710. Client transparent network device 705 communicates via an outer connection with a client, omitted from example 700 for clarity. Server transparent network device 710 communicates via an outer connection with a server, also omitted from example 700 for clarity. The outer connections between the client and server and their respective transparent network devices 705 and 710 may use the same or different sequence numbers, as illustrated in the examples above.

Transparent network devices 705 and 710 monitor the sequence numbers associated with their respective outer connections and compare these outer connection sequence numbers with the sequence numbers in use for the inner connection between transparent network devices 705 and 710. If the either of the outer connection receive windows gets within a specific range of the inner connection receive window, for example less than the outer connection receive window size, then the transparent network device 705 initiate an inner connection window jump to move the inner connection receive window further away from one or both of the outer connection receive windows.

Example 700 illustrates an inner connection window jump initiated by client transparent network device 705; however, inner connection window jumps may also be initiated by server transparent network device 710 in a similar manner. In example 700, client transparent network device 705 has established an inner connection with the server transparent network device 710. Inner connection network traffic may proceed normally with, for example, the client transparent network device 705 sending a first ACK message 703 including a sequence number 2000 and a window size of 1000 to the server transparent network device 710. Similarly, the server transparent network device 710 sends an ACK message 707 with a sequence number of 5000 and a window size of 1000 to the client transparent network device 705. Thus, at this point, the client transparent network device 705 can send network packets to the server transparent network device 710 using any sequence number between 5001 and 5999. Similarly, the server transparent network device 710 can send network packets to the client transparent network device 705 using any sequence number between 2001 and 2999.

To initiate an inner connection window jump, the client transparent network device 705 sends a ACK message 709 to the server transparent network device 710 with a sequence number at or near the maximum allowed by the inner connection receive window. For example, the sequence number of ACK message 709 may be set to the current sequence number+window size−1, which in this example 700 is 2999. The sequence number in ACK message 709 indicates to the server transparent network device 710 that it should advance its inner connection receive window. In response, server transparent network device 710 sends ACK message 711 to the client transparent network device with an acknowledgement number of 2999. This has the effect of advancing the receive window used by the server transparent network device 710 by window size−1, or 999. Following ACK message 711, the server transparent network device 710 will expect inner connection network traffic from the client transparent network device 705 with sequence numbers between 3000 and 3999.

In an embodiment, the server transparent network device 710 also advances its receive window by including a sequence number at or near the maximum allowed by the inner connection receive window. For example, the sequence number of ACK message 711 may be set to the current sequence number+window size−1, which in this example 700 is 5999. The sequence number in ACK message 711 indicates to the client transparent network device 705 that it should advance its inner connection receive window. In response, client transparent network device 705 sends ACK message 713 to the server transparent network device 710 with an acknowledgement number of 5999. This has the effect of advancing the receive window used by the client transparent network device 705 by window size−1, or 999. Following ACK message 713, the client transparent network device 705 will expect inner connection network traffic from the server transparent network device 710 with sequence numbers between 6000 and 6999.

In further embodiments, this approach for advancing the receive window may be repeated multiple times to move the receive window of the client transparent network device 705 and/or server transparent network device 710 further away from the outer connection receive window. In these embodiments, messages similar to messages 709, 711, and 713 may be repeated multiple times, with each message advancing the client transparent network device or server transparent network device receive window by an amount equal or near the maximum allowed by the window size for the inner connection.

In a further embodiment, client transparent network device 705 and server transparent network device 710 may use TCP window scaling options to increase the size of the receive window. In this embodiment, the maximum sequence number allowed for messages 709 and 711 may the current sequence number+receive window size*window scaling−1. Typically, the window scaling value multiplies the receive window size by a power of two, which may be implemented as a bit shift operation.

Figure 8:
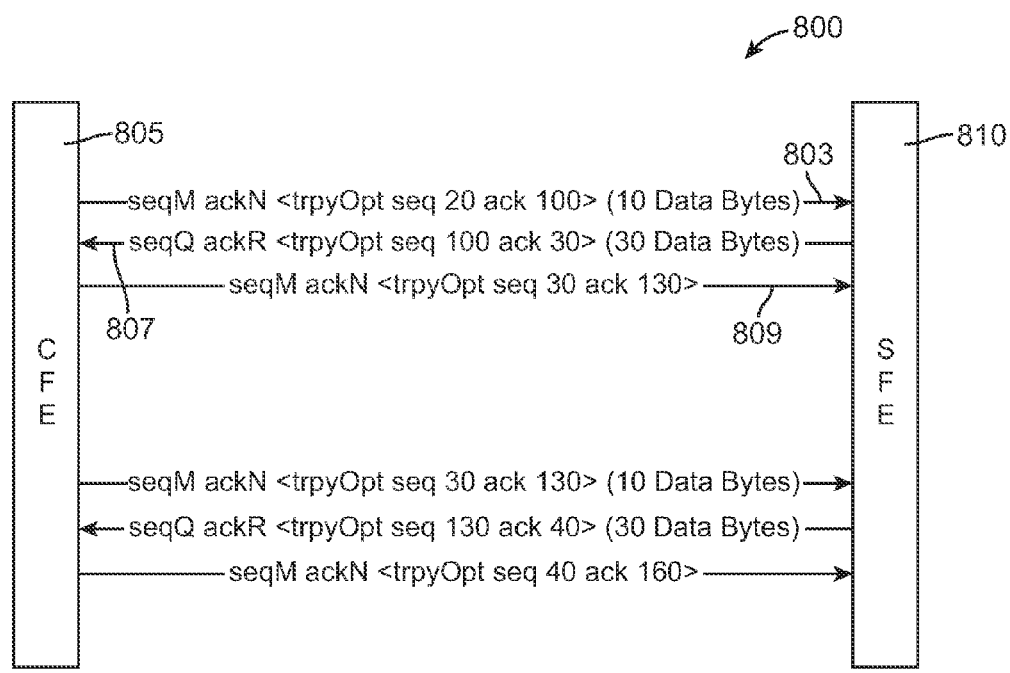
FIG. 8 illustrates a window-hold method of preventing data corruption when using an inner connection between transparent network devices according to an embodiment of the invention.

FIG. 8 illustrates an example 800 of a window-hold method of preventing data corruption when using an inner connection between transparent network devices according to an embodiment of the invention. In example 800, the sequence numbers of inner connection network traffic appears to be constant.

Example 800 includes a client transparent network device 805 and a server transparent network device 810. Client transparent network device 805 communicates via an outer connection with a client, omitted from example 800 for clarity. Server transparent network device 810 communicates via an outer connection with a server, also omitted from example 800 for clarity. The outer connections between the client and server and their respective transparent network devices 805 and 810 may use the same or different sequence numbers, as illustrated in the examples above.

Client transparent network device 805 and server transparent network device 810 establish an inner network connection using an initial set of arbitrary sequence values M and Q, respectively. However, these sequence values are not incremented by the client transparent network device 805 and server transparent network device 810 for subsequent inner connection network traffic. Instead, each inner connection network packet includes TCP options including inner connection parameters, referred to as trpyOpts in example 800, that include the actual sequence number assigned to the inner connection network packet. The transparent network devices will update the hidden sequence numbers in the TCP options for subsequent inner connection network packets.

In example 800, client transparent network device 805 sends message 803 to server transparent network device 810. Message 803 includes a TCP sequence number seqM. However, message 803 also includes TCP options including inner connection parameters trpyOpts including hidden sequence number value of 20. In this example, message 803 includes 10 bytes of data; thus, the next inner connection network packet from client transparent network device 805 should be 30. Similarly, server transparent network device 810 sends message 807 to client transparent network device 805 including a TCP sequence number seqQ. Message 805 includes TCP options including inner connection parameters trpyOpts including hidden sequence number value of 100 for this message 805 and an ACK value of 30, which acknowledges the receipt of message 803 and the next expected hidden sequence value from the client transparent network device 805. Message 807 includes 30 bytes of data; thus, the next inner connection network packet from server transparent network device 810 should have a hidden sequence value of 130. In example 800, client transparent network device 805 sends message 809 using the same TCP sequence number seqM to the server transparent network device 810. Message 809 includes TCP options including inner connection parameters trpyOpts including hidden sequence number value of 30 for this message 805 and an ACK value of 130, which indicates that message 807 has been received by client transparent network device 805.

The exchange of messages between transparent network devices 805 and 810 continues in a similar fashion, with all messages from client transparent network device 805 using seqM as its TCP sequence number and all messages from server transparent network device 801 using seqQ as its TCP sequence number. The inner connection parameters trpyOpts associated with each network packet include the actual sequence number of that packet and an acknowledgement of the next sequence number expected from the other network device.

The embodiment illustrated by example 800 holds the TCP receive window for inner connection network traffic in place. As long as there is no overlap between the outer connection receive window and the inner connection receive window, inner connection network traffic inadvertently received by outer connection network devices, such as a client or server, will be rejected. However, the outer connection TCP receive window will still move as outer connection network traffic gradually increments their TCP sequence numbers. Thus, at some point, the outer connection TCP receive window may overlap with the inner connection TCP receive window. In an embodiment, a window jump as illustrated in example 700 may be performed to prevent or correct any overlap in the inner and outer connection TCP receive windows.

Figure 9:
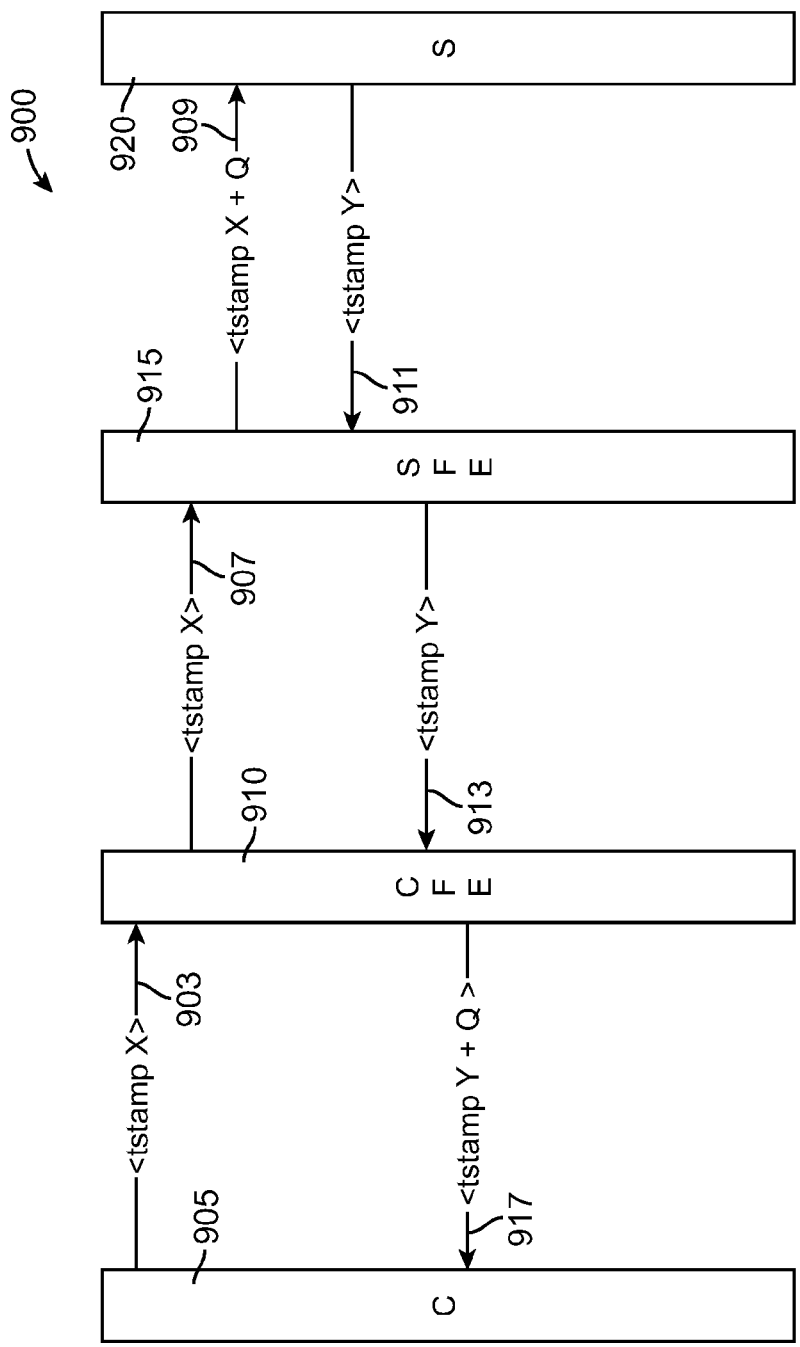
FIG. 9 illustrates a timestamp-based method of preventing data corruption when using an inner connection between transparent network devices according to an embodiment of the invention.

FIG. 9 illustrates an example 900 of timestamp-based method of preventing data corruption when using an inner connection between transparent network devices according to an embodiment of the invention. In some network protocols, such as variations of TCP/IP that support RFC 1323, network devices may include a timer or counter that maintains a timestamp value. This timestamp value is incremented periodically, such that timestamp values are proportional to elapsed time. A network device may include its current timestamp value in each outgoing network packet. Upon receipt of this network packet by a destination network device, an acknowledgement message, such as an ACK message, will be returned to the sender. The ACK message can include a copy of this timestamp value. By comparing the timestamp value received in an ACK message with its current timestamp value, a network device can determine the elapsed time since it sent the original message.

Embodiments of the invention can use this timestamp feature to prevent data corruption. In some network protocols, such as variations of TCP/IP that support RFC 1323, network devices will reject a network packet if its timestamp value is less than the timestamp value of a recently received network packet. This feature, referred to as PAWS in the TCP protocol, assumes that a network packet with a much lower timestamp value than recently received network packets is an older network packet that was assumed to be lost and then already retransmitted, making this network packet redundant.

To prevent data corruption, an embodiment of the invention adds a large offset to the timestamp values of outer connection network packets. Thus, the timestamp values of inner connection network packets will be much less than the timestamp values of outer connection network packets. If an inner connection network packet is inadvertently received by an outer connection network device, it will be rejected by that device because its timestamp value is much less than the timestamp values used by outer connection network packets.

Example 900 illustrates an application of this method according to an embodiment of the invention. Example 900 includes a client 905, a client transparent network device 910, a server transparent network device 915, and a server 920. Client 905 sends a message 903 addressed to server 920 and including a timestamp value of X. Message 903 is intercepted by client transparent network device 910 and forwarded towards the server 920 in the form of message 907.

Message 907 is intercepted by server transparent network device 915. Server transparent network device 915 adds an offset value Q to the timestamp of message 907 and forwards this modified message to the server 920 in the form of message 909.

Similarly, server 920 sends a message 911 addressed to client 905 and including a timestamp value of Y. Message 911 is intercepted by server transparent network device 915 and forwarded towards the client 905 in the form of message 913.

Message 913 is intercepted by client transparent network device 910. Client transparent network device 910 adds an offset value Q to the timestamp of message 913 and forwards this modified message to the client 905 in the form of message 917. In an embodiment, any offset value added to a message by a client transparent network device before traversing the inner network connection is subtracted by the server transparent network device at the other end of the inner network connection, so that timestamp measurements of the client will not be corrupted.

Figure 10:
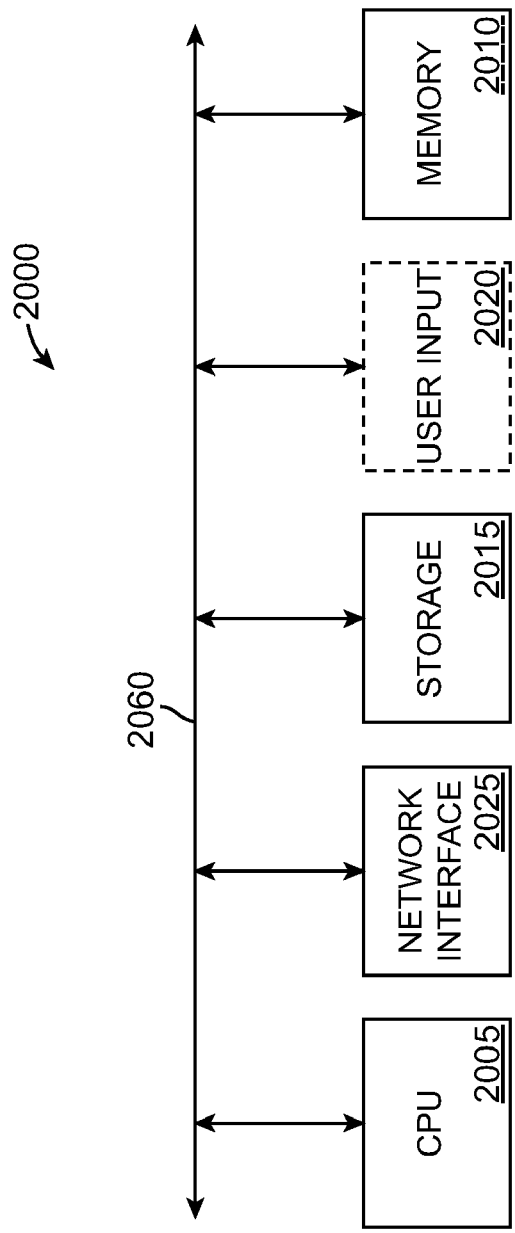
FIG. 10 illustrates an example computer system capable of implementing a transparent network device according to an embodiment of the invention.

FIG. 10 illustrates an example computer system capable of implementing a transparent network device according to an embodiment of the invention. FIG. 10 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art after reading the attached documents. For example, embodiments of the invention can be used with any number of network connections and may be added to any type of network device, client or server computer, or other computing device in addition to the computer illustrated above. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of initiating a connection between transparent network devices, the method comprising:

intercepting a first message from a client device and addressed to a server device, wherein the first message includes a first sequence number and is adapted to initiate a first connection between the client device and the server device;

creating a first modified version of the first message adapted to initiate a second connection with a transparent network device in addition to the first connection with the server;

sending the first modified version of the first message towards the server device;

intercepting a second message from the server device and addressed to the client device, wherein the second message is adapted to continue the initiation of the first connection between the client device and the server device;

determining if the second message was previously intercepted by the transparent network device; and in response to the determination that the second message was previously intercepted by the transparent network device, sending a second modified version of the first message towards the server, wherein the second modified version of the first message is adapted to continue the initiation of the second connection with the transparent network device;

wherein the second modified version of the first message includes a source address, a destination address, and a sequence number equal to a source address, a destination address, and a sequence number included in the first modified version of the first message.

2. The method of claim 1, comprising:
receiving a first modified version of the second message in response to sending the second modified version of the first message, wherein the first modified version of the second message is adapted to continue the initiation of the second connection with the transparent network device; and
sending an acknowledgement message towards the server, wherein the acknowledgement message is adapted to indicate the establishment of a portion of the first connection with the client and the establishment of the second connection with the transparent network device.

3. The method of claim 2, wherein the first modified version of the second message includes a source address, a destination address, and a sequence number equal to a source address, a destination address, and a sequence number included in the second message.

4. The method of claim 3, wherein determining if the second message was previously intercepted by the transparent network device comprises determining if the second message includes a transparent device parameter previously added to the second message by the transparent device.

5. The method of claim 1, wherein the second modified version of the first message includes a source address, a destination address, and a sequence number equal to a source address, a destination address, and a sequence number included in the first message.

6. The method of claim 1, wherein the first and second modified versions of the first message each include a client parameter equal to a client parameter included in the first message.

7. The method of claim 1, wherein the first message includes a first source network port different than a second source network port included in the second modified version of the first message.

8. A method of initiating a connection between transparent network devices, the method comprising:
intercepting a first message from a client device and addressed to a server device, wherein the first message is adapted to initiate a first connection between the client device and the server device;
creating a first modified version of the first message adapted to initiate a second connection with a second transparent network device in addition to the first connection with the server;
sending the first modified version of the first message towards the server device;
intercepting a second message from the server device and addressed to the client device, wherein the second message is adapted to continue the initiation of the first connection between the client device and the server device;
determining if the second message was previously intercepted by the second transparent network device;
in response to the determination that the second message was previously intercepted by the second transparent network device, sending a third message adapted to reset at least a first portion of the first connection; and
sending a second modified version of the first message towards the server, wherein the second modified version of the first message is adapted to continue the initiation of the second connection with the transparent network device.

9. The method of claim 8, comprising:
receiving a first modified version of the second message in response to sending the second modified version of the first message, wherein the first modified version of the second message is adapted to continue the initiation of the second connection with the transparent network device; and
sending an acknowledgement message towards the server, wherein the acknowledgement message is adapted to indicate the establishment of a portion of the first connection between the first transparent network device and the client and the establishment of the second connection with second transparent network device.

10. The method of claim 9, wherein the second modified version of the first message includes a first sequence number different than a second sequence number included in the first modified version of the first message.

11. The method of claim 8, wherein the second modified version of the first message includes a source address and a destination address equal to a source address and a destination address included in the first modified version of the first message.

12. The method of claim 8, wherein the first portion of the first connection reset by the third message does not include a second portion of the first connection between the transparent network device and the server.

13. The method of claim 8, wherein the first portion of the first connection reset by the second message does not include a second portion of the first connection between the transparent network device and the server.

14. A method of initiating a connection between transparent network devices, the method comprising:
intercepting a first message from a client device and addressed to a server device, wherein the first message is adapted to initiate a first connection between the client device and the server device;
creating a first modified version of the first message adapted to initiate a second connection with a second transparent network device in addition to the first connection with the server;
sending the first modified version of the first message towards the server device;
intercepting a second message from the server device and addressed to the client device, wherein the second message is adapted to reset at least a first portion of the first connection between the client device and the server device;
determining if the second message was created by the second transparent network device; and
in response to the determination that the second message was created by the second transparent network device, sending a second modified version of the first message towards the server, wherein the second modified version of the first message is adapted to continue the initiation of the second connection with the transparent network device.

15. The method of claim 14, comprising:
receiving a third message in response to sending the second modified version of the first message, wherein the third message is adapted to continue the initiation of the second connection with the transparent network device; and
sending an acknowledgement message towards the server, wherein the acknowledgement message is adapted to indicate the establishment of a portion of the first connection between the first transparent network device and the client and the establishment of the second connection with second transparent network device.

16. The method of claim 15, wherein the second modified version of the first message includes a source address and a destination address equal to a source address and a destination address included in the first modified version of the first message.

17. The method of claim 16, wherein a first sequence number included in the first modified version of the first message is different than a second sequence number included in the second modified version of the first message.

18. A method of initiating a connection between transparent network devices, the method comprising:
   intercepting a first message from a client device and addressed to a server device, wherein the first message includes a first connection parameter adapted to initiate a first network connection between the client device and the server device;
   creating a first modified version of the first message including the first connection parameter and a second connection parameter adapted to initiate a second network connection with a transparent network device, wherein the second connection parameter is included in a transparency-unrelated portion of the first modified version of the first message;
   sending the first modified version of the first message towards the server device;
   intercepting a second message from the server device and addressed to the client device, wherein the second message is adapted to continue the initiation of the first network connection between the client device and the server device;
   determining if the second message was previously intercepted by the transparent network device; and
   in response to the determination that the second message was previously intercepted by the transparent network device, continuing the initiation of the second network connection.

19. The method of claim 18, wherein determining if the second message was previously intercepted by the transparent network device comprises:
   searching a transparency-unrelated portion of the second message for an indicator added to the second message by the transparent network device.

20. The method of claim 18, comprising:
   sending the second message towards the client device.

21. The method of claim 18, comprising:
   in response to the determination that the second message was previously intercepted by the transparent network device, sending a modified second message towards the client device.

22. The method of claim 18, wherein the transparency-unrelated portion of the first modified message includes a protocol extension field.

23. The method of claim 22, wherein the protocol extension field includes a TCP options field.

24. The method of claim 18, wherein the transparency-unrelated portion of the first modified message includes a sequence number.

25. The method of claim 18, wherein continuing the initiation of the second network connection comprises:
   creating a third message adapted to continue the initiation of the second network connection with the transparent network device, wherein the third message includes a third connection parameter, wherein the third connection parameter is included in a transparency-unrelated portion of the third message; and
   sending the third message towards the server device.

26. The method of claim 25, wherein the third message is a second modified version of the first message including the first connection parameter.

27. The method of claim 26, comprising:
   sending a fourth message adapted to reset at least a first portion of the first network connection.

28. The method of claim 25, wherein the third message is an acknowledgement message.

* * * * *